United States Patent
Ma et al.

(10) Patent No.: US 11,895,313 B2
(45) Date of Patent: *Feb. 6, 2024

(54) MOTION MODEL SIGNALING

(71) Applicant: Huawei Technologies Co., Ltd., Shenzhen (CN)

(72) Inventors: Xiang Ma, Shenzhen (CN); Haitao Yang, Shenzhen (CN); Huanbang Chen, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,793

(22) Filed: Jan. 27, 2022

(65) Prior Publication Data

US 2022/0264135 A1 Aug. 18, 2022

Related U.S. Application Data

(63) Continuation of application No. 17/150,963, filed on Jan. 15, 2021, now Pat. No. 11,277,629, which is a (Continued)

(51) Int. Cl.
*H04N 19/46* (2014.01)
*H04N 19/132* (2014.01)
(Continued)

(52) U.S. Cl.
CPC ........... *H04N 19/46* (2014.11); *H04N 19/132* (2014.11); *H04N 19/159* (2014.11); (Continued)

(58) Field of Classification Search
CPC ............................ H04N 19/46; H04N 19/132
See application file for complete search history.

(56) References Cited

U.S. PATENT DOCUMENTS

| 2017/0332095 A1 | 11/2017 | Zou et al. |
| 2018/0077417 A1 | 3/2018 | Huang |

(Continued)

FOREIGN PATENT DOCUMENTS

| CN | 107979756 A | 5/2018 |
| WO | 2017087751 A1 | 5/2017 |

(Continued)

OTHER PUBLICATIONS

Qiu, S., et al, "A Real-time Video Compression for UAV Based on Affine Model," Journal of Electronics and Information Technology, vol. 36, No. 12, Dec. 2014, With an English Abstract, 6 pages.

(Continued)

*Primary Examiner* — Jerry T Jean Baptiste
(74) *Attorney, Agent, or Firm* — Conley Rose, P.C.

(57) ABSTRACT

A method of determining one or more candidate prediction modes, the method comprises deriving, by a processor, a first indicator by parsing a bitstream, wherein the first indicator specifies whether any affine model is a candidate motion model for an image block in a preset area; determining, by the processor, that the first indicator is set to 1; deriving, by the processor and based on the determination that the first indicator is set to 1, a second indicator by parsing the bitstream, wherein the second indicator specifies whether a 6-parameter affine model is a candidate motion model for the image block; and determining, by the processor, one or more candidate prediction modes for the image block based on the first indicator and the second indicator.

34 Claims, 11 Drawing Sheets

Related U.S. Application Data continuation of application No. PCT/US2019/020743, filed on Mar. 5, 2019.

(60) Provisional application No. 62/732,343, filed on Sep. 17, 2018, provisional application No. 62/725,684, filed on Aug. 31, 2018, provisional application No. 62/699,554, filed on Jul. 17, 2018.

(51) Int. Cl.
    *H04N 19/159* (2014.01)
    *H04N 19/174* (2014.01)
    *H04N 19/51* (2014.01)
    *H04N 19/70* (2014.01)

(52) U.S. Cl.
    CPC ........... *H04N 19/174* (2014.11); *H04N 19/51* (2014.11); *H04N 19/70* (2014.11)

(56) References Cited

U.S. PATENT DOCUMENTS

| | | | |
|---|---|---|---|
| 2018/0098063 A1 | 4/2018 | Chen et al. | |
| 2018/0184126 A1* | 6/2018 | Zhang | H04N 19/157 |
| 2019/0110064 A1 | 4/2019 | Zhang et al. | |
| 2020/0396465 A1* | 12/2020 | Zhang | H04N 19/159 |

FOREIGN PATENT DOCUMENTS

| | | |
|---|---|---|
| WO | 2017118409 A1 | 7/2017 |
| WO | 2018061563 A1 | 4/2018 |
| WO | 2018128379 A1 | 7/2018 |

OTHER PUBLICATIONS

Bross, et al., "Versatile Video Coding (Draft 3)," Joint Video Experts Team (JVET) of ITU-T SG 16 WP 3 and ISO/IED UTC 1/SC WG 11, Document: JVET-L1001v3, 12th Meeting: Macao, CN, Oct. 3-12, 2018, 181 pages.

Bross, et al., "Versatile Video Coding (Draft 2)," Joint Video Experts Team (JVET) of ITU-T SG 16 WP 3 and ISO/IEC UTC 1/SC 29/WG 11, Document: JVET-K1001v7, Ljubljana SI, Jul. 10-18, 2018, 140 pages.

Bross, et al., "Versatile Video Coding (Draft 10)," Joint Video Experts Team (JVET) of ITU-T SG 16 WP 3 and ISO/IEC UTC 1/SC 29/WG 11, Document: JVET-S2001-vH, Jun. 22-Jul. 1, 2020, 548 pages.

Han, et al, "CE4-1.3: Affine Motion Compensation Prediction," Joint Video Exploration Team (JVET) of ITU-T SG 16 NP 3 and ISO/IEC JTC 1/SC 29/WG11, Document: JVET-K0337, Ljubljana, SI, Jul. 10-18, 2018, 6 pages.

Yang, et al., "Draft Text for Affine Motion Compensation," Joint Video Experts Team (JVET) of ITU-T SG 16 WP 3 and ISO/IEC JTC 1/SC 29/WG 11, Document JVET-K0565-v2, Ljubljana, SI, Jul. 10-18, 2018, 61 pages.

Chen, et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Document: JVET-G1001-v1, Jul. 13-21, 2017, 51 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

"Series H: Audiovisual and Multimedia Systems; Infrastructure of Audiovisual Services—Coding of Moving Video Coding for Low Bit Rate Communication," Recommendation ITU-T H.263, Jan. 2005, 226 pages.

Document: JVET-J0024, Akula, S. et al., "Description of SDR, HDR and 360 video coding technology proposal considering mobile application scenario by Samsung, Huawei, GoPro, and HiSilicon" Joint Video Exploration Team (JVET) of ITU-T SG 16 WP 3 and ISO/IEC JTC 1/SC 29/WG 11 10th Meeting: San Diego, US, URL:http://phenix.it-sudparis.eu/jvet/doc_end_user/documents/10_San%20Diego/wg11/JVET-J0024-v5.zip>: Apr. 10-20, 2018, 139 pages.

Huanbang Chen, et al., "Description of SDR, HDR and 360 video coding technology proposal by Huawei, GoPro, HiSilicon, and Samsung," Joint Video Exploration Team (JVET) of ITU-T SG 16 WP 3 and ISO/IEC JTC 1/SC 29/WG 11, JVET-J0025_v2, 10th Meeting: San Diego, US, Apr. 2018, pp. 5-6, 10-15, 30.

* cited by examiner

| seq_parameter_set_rbsp() { | Descriptor |
|---|---|
| ... | |
| Sps_affine_inter_flag | u(1) |
| if(Sps_affine_inter_flag) | |
| Sps_affine_type_flag | u(1) |
| ... | |
| rbsp_trailing_bits() | |
| } | |

| seq_parameter_set_rbsp() { | Descriptor |
|---|---|
| ... | |
| Sps_affine_inter_flag | u(1) |
| Sps_affine_type_flag | u(1) |
| ... | |
| rbsp_trailing_bits() | |
| } | |

| coding_unit_unit(x0, y0, cbWidth, cbHeight) { | Descriptor |
|---|---|
| ... | |
| if(Sps_affine_inter_flag) | |
| afine_inter_flag[x0][y0] | ae(v) |
| if(Sps_affine_type_flag&&affine_inter_flag[x0][y0]) | |
| affine_type_flag[x0][y0] | ae(v) |
| ... | |
| } | |

| slice_segment_header() { | Descriptor |
|---|---|
| ... | |
| Slice_affine_inter_flag | u(1) |
| If(Slice_affine_inter_flag) | |
| Slice_affine_type_flag | u(1) |
| ... | |
| } | |

| slice_segment_header() { | Descriptor |
|---|---|
| ... | |
| Slice_affine_inter_flag | u(1) |
| Sps_affine_type_flag | u(1) |
| ... | |
| } | |

| coding_unit(x0, y0, cbWidth, cbHeight) { | Descriptor |
|---|---|
| ... | |
| if(Slice_affine_inter_flag) | |
| affine_inter_flag[x0][y0] | ae(v) |
| if(Slice_affine_type_flag&&affine_inter_flag[x0][y0]) | |
| affine_type_flag[x0][y0] | ae(v) |
| ... | |
| } | |

| seq_parameter_set_rbsp() { | Descriptor |
|---|---|
| ... | |
| Sps_affine_inter_flag | u(1) |
| if(Sps_affine_inter_flag) | |
| Sps_affine_type_flag | u(1) |
| ... | |
| } | |

| seq_parameter_set_rbsp() { | Descriptor |
|---|---|
| ... | |
| Sps_affine_inter_flag | u(1) |
| Sps_affine_type_flag | u(1) |
| ... | |
| rbsp_trailing_bits() | |
| } | |

| slice_segment_header() { | Descriptor |
|---|---|
| ... | |
| if(Sps_affine_inter_flag) | |
| Slice_affine_inter_flag | u(1) |
| If(Sps_affine_type_flag) | |
| Slice_affine_type_flag | u(1) |
| ... | |
| } | |

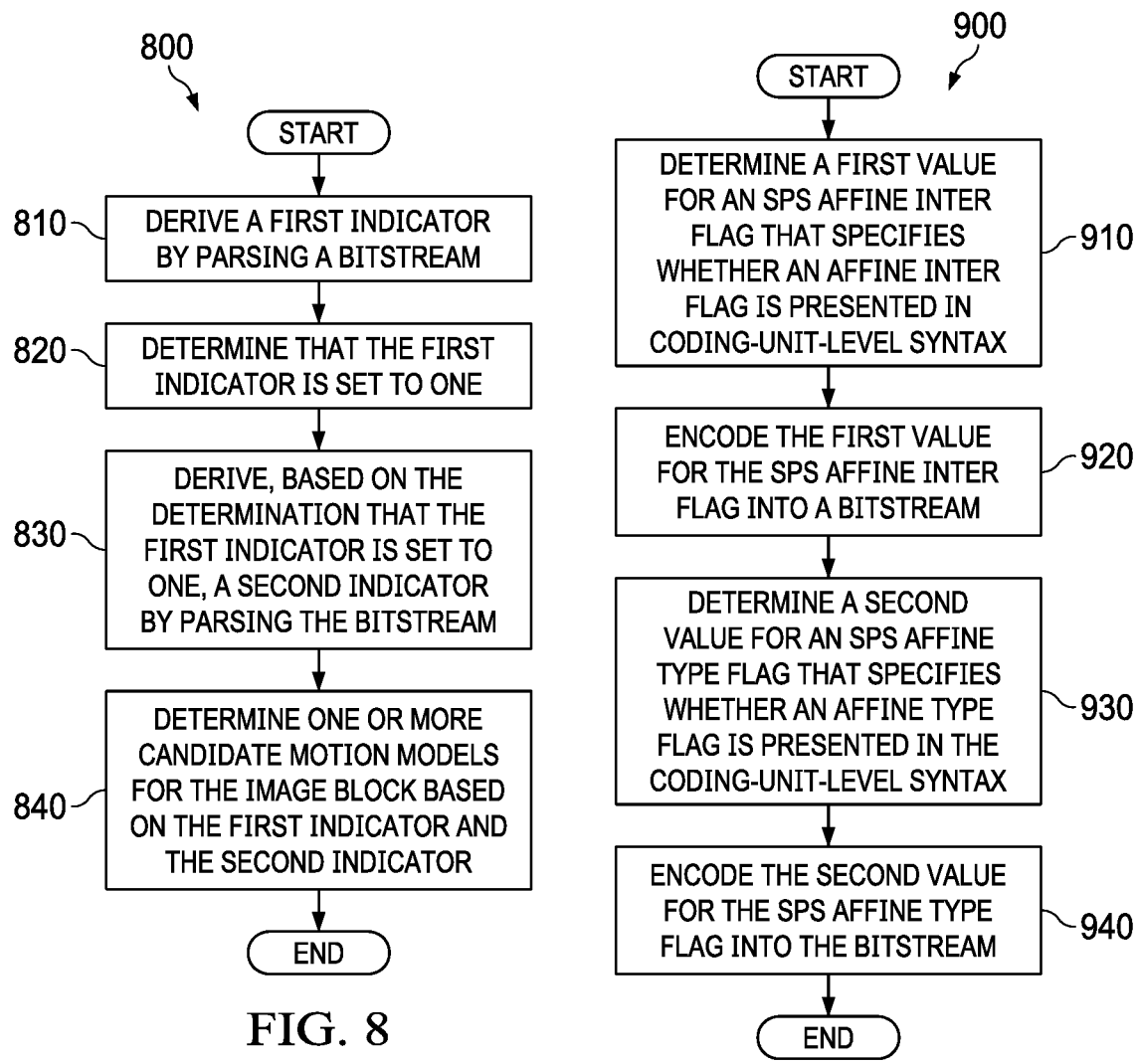

700

| coding_unit_(x0, y0, cbWidth, cbHeight) { | Descriptor |
|---|---|
| ... | |
| motion_model_idc[x0][y0] = affine_inter_flag[x0][y0] + affine_type_flag[x0] [y0] | |
| if(inter_pred_idc[x0][y0] != PRED_L1) { | |
| if(num_ref_idx_l0_active_minus1>0) | |
| ref_idx_l0[x0][y0] | ae(v) |
| mvd_coding(x0,y0,0,0) | |
| if(motion_model_idc[x0][y0]>0) { | |
| mvd_coding(x0,y0,0,1) | |
| if(motion_model_idc[x0][y0]>1) | |
| mvd_coding(x0,y0,0,2) | |
| } | |
| } | |
| ... | |
| if(inter_pred_idc[x0][y0] !=PRED_L0) { | |
| if(num_ref_idx_l1_active_minus1>0) | |
| ref_idx_l1[x0][y0] | ae(v) |
| mvd_coding(x0,y0,1,0) | |
| if(motion_model_idc[x0][y0] >0 ) { | |
| mvd_coding(x0,y0,1,1) | |
| if(motion_model_idc[x0][y0] >1 ) | |
| mvd_coding(x0,y0,1,2) | |
| } | |
| } | |
| ... | |

FIG. 7

MOTION MODEL SIGNALING

CROSS-REFERENCE TO RELATED APPLICATIONS

This is a continuation of U.S. patent application Ser. No. 17/150,963 filed on Jan. 15, 2021, which is a continuation of Int'l Patent App. No. PCT/US2019/020743 filed on Mar. 5, 2019, which claims priority to U.S. Prov. Patent App. No. 62/699,554 filed on Jul. 17, 2018, U.S. Prov. Patent App. No. 62/725,684 filed on Aug. 31, 2018, and U.S. Prov. Patent App. No. 62/732,343 filed on Sep. 17, 2018, all of which are incorporated by reference.

TECHNICAL FIELD

The disclosed embodiments relate to video coding in general and motion model signaling in particular.

BACKGROUND

Videos use a relatively large amount of data, so communication of videos uses a relatively large amount of bandwidth. However, many networks operate at or near their bandwidth capacities. In addition, customers demand high video quality, which requires using even more data. There is therefore a desire to both reduce the amount of data videos use and improve video quality. One solution is to compress videos during an encoding process and decompress the videos during a decoding process.

SUMMARY

A first aspect relates to a method of determining one or more candidate prediction modes, the method comprising deriving, by a processor, a first indicator by parsing a bitstream, wherein the first indicator specifies whether any affine model is a candidate motion model for an image block in a preset area; determining, by the processor, that the first indicator is set to 1; deriving, by the processor and based on the determination that the first indicator is set to 1, a second indicator by parsing the bitstream, wherein the second indicator specifies whether a 6-parameter affine model is a candidate motion model for the image block; and determining, by the processor, one or more candidate prediction modes for the image block based on the first indicator and the second indicator. The method provides for more efficient coding of affine models and for coding of the translation model.

In a first implementation form of the method according to the first aspect as such, before deriving the second indicator, the method further comprises determining that an affine model is the candidate motion model, and wherein the method further comprises further deriving the second indicator in response to determining that the affine model is the candidate motion model.

In a second implementation form of the method according to the first aspect as such or any preceding implementation form of the first aspect, deriving the first indicator comprising parsing an SPS of a sequence of the bitstream, wherein the preset area comprises the sequence, any slice in the sequence, or any CU in the sequence, and deriving the second indicator comprises parsing the SPS.

In a third implementation form of the method according to the first aspect as such or any preceding implementation form of the first aspect, the method further comprises deriving, in response to an affine model being the candidate motion model, a sixth indicator by parsing a slice header of a slice in the sequence, wherein the sixth indicator specifies whether any affine model is a candidate motion model for the image block in the slice.

In a fourth implementation form of the method according to the first aspect as such or any preceding implementation form of the first aspect, the method further comprises deriving, in response to the 6-parameter affine model being the candidate motion model, a seventh indicator by parsing a slice header of a slice in the sequence, wherein the seventh indicator specifies whether the 6-parameter affine model is a candidate prediction model for the image block in the slice.

In a fifth implementation form of the method according to the first aspect as such or any preceding implementation form of the first aspect, the method further comprises further deriving the first indicator by parsing a slice header of a slice of the bitstream, wherein the preset area comprises the slice or any coding unit in the slice; and further deriving the second indicator by parsing the slice header.

In a sixth implementation form of the method according to the first aspect as such or any preceding implementation form of the first aspect, the method further comprises deriving, in response to an affine model being the candidate motion model, a third indicator by parsing the bitstream, wherein the third indicator specifies whether a prediction mode of the image block is an affine merge mode.

In a seventh implementation form of the method according to the first aspect as such or any preceding implementation form of the first aspect, in response to an affine model being the candidate motion model, the method further comprises deriving a fourth indicator by parsing the bitstream; determining, in response to the fourth indicator being a first value, that a prediction mode of the image block is not an affine inter mode; and determining, in response to the fourth indicator being a second value, that the prediction mode is an affine inter mode, wherein the affine inter mode is a 6-parameter affine model mode or a 4-parameter affine model mode.

In an eighth implementation form of the method according to the first aspect as such or any preceding implementation form of the first aspect, in response to the prediction mode being the affine inter mode, the method further comprises deriving a fifth indicator by parsing the bitstream; determining, in response to the fifth indicator being a third value, that the prediction mode is the 6-parameter affine model mode; and determining, in response to the fifth indicator being a fourth value, that the prediction mode is the 4-parameter affine model mode.

In a ninth implementation form of the method according to the first aspect as such or any preceding implementation form of the first aspect, in response to the first value being 1, the second value being 0, the third value being 0, and the fourth value being 1, the method further comprises deriving a sum value by adding values of the fourth indicator and the fifth indicator; deriving, in response to the sum value being greater than 0, a first set of MVD information by parsing the bitstream; and deriving, in response to the sum value being greater than 1, a second set of MVD information by parsing the bitstream.

A second aspect relates to an apparatus for determining one or more candidate prediction modes, the apparatus comprising a memory; and a processor coupled to the memory and configured to perform any of the first aspect as such or any preceding implementation form of the first aspect.

A third aspect relates to a computer program product comprising computer-executable instructions stored on a non-transitory medium that when executed by a processor cause an apparatus to perform any of the first aspect as such or any preceding implementation form of the first aspect.

A fourth aspect relates to a method comprising determining a first value for an SPS affine inter flag that specifies whether an affine inter flag is presented in coding-unit-level syntax; encoding the first value for the SPS affine inter flag into a bitstream; determining a second value for an SPS affine type flag that specifies whether an affine type flag is presented in the coding-unit-level syntax; and encoding the second value for the SPS affine type flag into the bitstream. The method provides for more efficient coding of affine models and for coding of the translation model.

In a first implementation form of the method according to the fourth aspect as such, the SPS affine type flag is conditionally signaled based on the first value.

In a second implementation form of the method according to the fourth aspect as such or any preceding implementation form of the fourth aspect, the method further comprises determining a third value for an affine inter flag that specifies whether affine-model-based motion compensation is used to generate prediction samples of a current coding unit; encoding the third value for the affine inter flag into the bitstream; determining a fourth value for an affine type flag that specifies whether 6-parameter-affine-model-based motion compensation is used to generate prediction samples of the current coding unit; and encoding the fourth value for the affine type flag into the bitstream.

In a third implementation form of the method according to the fourth aspect as such or any preceding implementation form of the fourth aspect, the affine inter flag is conditionally signaled based on the first value, and wherein the affine type flag is conditionally signaled based on the second value.

A fifth aspect relates to an apparatus comprising a memory; and a processor coupled to the memory and configured to perform any of the fourth aspect as such or any preceding implementation form of the fourth aspect.

A sixth aspect relates to a computer program product comprising computer-executable instructions stored on a non-transitory medium that when executed by a processor cause an apparatus to perform any of the fourth aspect as such or any preceding implementation form of the fourth aspect.

A seventh aspect relates to a method comprising receiving a bitstream comprising an SPS affine inter flag and an SPS affine type flag; determining, based on a first value of the SPS affine inter flag, whether an affine inter flag is presented in coding-unit-level syntax; and determining, based on a second value of the SPS affine type flag, whether an affine type flag is presented in the coding-unit-level syntax. The method provides for more efficient coding of affine models and for coding of the translation model.

In a first implementation form of the method according to the seventh aspect as such, the SPS affine type flag is conditionally signaled based on the first value.

In a second implementation form of the method according to the seventh aspect as such or any preceding implementation form of the first aspect, the bitstream further comprises an affine inter flag and an affine type flag, and wherein the method further comprises: determining, based on a third value of the affine inter flag, whether affine-model-based motion compensation is used to generate prediction samples of a current coding unit; and determining, based on a fourth value of the affine type flag, whether 6-parameter-affine-model-based motion compensation is used to generate prediction samples of the current coding unit.

In a third implementation form of the method according to the seventh aspect as such or any preceding implementation form of the first aspect, the affine inter flag is conditionally signaled based on the first value, and wherein the affine type flag is conditionally signaled based on the second value.

An eighth aspect relates to an apparatus comprising a memory; and a processor coupled to the memory and configured to perform any of the seventh aspect as such or any preceding implementation form of the seventh aspect.

A ninth aspect relates to a computer program product comprising computer-executable instructions stored on a non-transitory medium that when executed by a processor cause an apparatus to perform any of the seventh aspect as such or any preceding implementation form of the seventh aspect.

A tenth aspect relates to a method comprising determining a first value for a slice affine inter flag that specifies whether syntax elements of a current picture shall be constrained such that affine inter mode is used in decoding of the current picture; encoding the first value for the slice affine inter flag into a bitstream; determining a second value for a slice affine type flag that specifies whether syntax elements of the current picture shall be constrained such that a 6-parameter affine mode is used in decoding of the current picture; and encoding the second value for the slice affine type flag into the bitstream. The method provides for more efficient coding of affine models and for coding of the translation model.

In a first implementation form of the method according to the tenth aspect as such, the slice affine type flag is conditionally signaled based on the first value.

In a second implementation form of the method according to the tenth aspect as such or any preceding implementation form of the tenth aspect, the method further comprises determining a third value for an affine inter flag that specifies whether affine-model-based motion compensation is used to generate prediction samples of a current coding unit; encoding the third value for the affine inter flag into the bitstream; determining a fourth value for an affine type flag that specifies whether 6-parameter-affine-model-based motion compensation is used to generate prediction samples of the current coding unit; and encoding the fourth value for the affine type flag into the bitstream.

In a third implementation form of the method according to the tenth aspect as such or any preceding implementation form of the tenth aspect, the affine inter flag is conditionally signaled based on the first value, and wherein the affine type flag is conditionally signaled based on the second value.

An eleventh aspect relates to an apparatus comprising a memory; and a processor coupled to the memory and configured to perform any of the tenth aspect as such or any preceding implementation form of the tenth aspect.

A twelfth aspect relates to a computer program product comprising computer-executable instructions stored on a non-transitory medium that when executed by a processor cause an apparatus to perform any of the tenth aspect as such or any preceding implementation form of the tenth aspect.

A thirteenth aspect relates to a method comprising receiving a bitstream comprising a slice affine inter flag and a slice affine type flag; determining, based on a first value of the slice affine inter flag, whether syntax elements of a current picture shall be constrained such that affine inter mode is used in decoding of the current picture; and determining, based on a second value of the slice affine type flag, whether syntax elements of the current picture shall be constrained such that a 6-parameter affine mode is used in decoding of the current picture. The method provides for more efficient coding of affine models and for coding of the translation model.

In a first implementation form of the method according to the thirteenth aspect as such, the slice affine type flag is conditionally signaled based on the first value.

In a second implementation form of the method according to the thirteenth aspect as such or any preceding implementation form of the thirteenth aspect, the bitstream further comprises an affine inter flag and an affine type flag, and wherein the method further comprises determining, based on a third value of the affine inter flag, whether affine-model-based motion compensation is used to generate prediction samples of a current coding unit; and determining, based on a fourth value of the affine type flag, whether 6-parameter-affine-model-based motion compensation is used to generate prediction samples of the current coding unit.

In a third implementation form of the method according to the thirteenth aspect as such or any preceding implementation form of the thirteenth aspect, the affine inter flag is conditionally signaled based on the first value, and wherein the affine type flag is conditionally signaled based on the second value.

A fourteenth aspect relates to an apparatus comprising a memory; and a processor coupled to the memory and configured to perform any of the thirteenth aspect as such or any preceding implementation form of the thirteenth aspect.

A fifteenth aspect relates to a computer program product comprising computer-executable instructions stored on a non-transitory medium that when executed by a processor cause an apparatus to perform any of the thirteenth aspect as such or any preceding implementation form of the thirteenth aspect.

A sixteenth aspect relates to a method comprising determining a first value for an SPS affine inter flag that specifies whether a slice affine inter flag is presented in slice-segment-header-level syntax and whether syntax elements of a video sequence shall be constrained such that affine inter mode is used in decoding of a video sequence; encoding the first value for the SPS affine inter flag into a bitstream; determining a second value for an SPS affine type flag that specifies whether a slice affine type flag is presented in slice-segment-header-level syntax and whether syntax elements of a video sequence shall be constrained such that a 6-parameter affine mode is used in decoding of the video sequence; and encoding the second value for the SPS affine type flag into the bitstream. The method provides for more efficient coding of affine models and for coding of the translation model.

In a first implementation form of the method according to the sixteenth aspect as such, the SPS affine type flag is conditionally signaled based on the first value.

In a second implementation form of the method according to the sixteenth aspect as such or any preceding implementation form of the sixteenth aspect, the method further comprises determining a third value for a slice affine inter flag that specifies whether syntax elements of a current picture shall be constrained such that affine inter mode is used in decoding of the current picture; encoding the third value for the slice affine inter flag into a bitstream; determining a fourth value for a slice affine type flag that specifies whether syntax elements of the current picture shall be constrained such that a 6-parameter affine mode is used in decoding of the current picture; and encoding the second value for the slice affine type flag into the bitstream.

In a third implementation form of the method according to the sixteenth aspect as such or any preceding implementation form of the sixteenth aspect, the slice affine inter flag is conditionally signaled based on the first value, and wherein the slice affine type flag is conditionally signaled based on the second value.

In a fourth implementation form of the method according to the sixteenth aspect as such or any preceding implementation form of the sixteenth aspect, the method further comprises determining a fifth value for an affine inter flag that specifies whether affine-model-based motion compensation is used to generate prediction samples of a current coding unit; encoding the fifth value for the affine inter flag into the bitstream; determining a sixth value for an affine type flag that specifies whether 6-parameter-affine-model-based motion compensation is used to generate prediction samples of the current coding unit; and encoding the sixth value for the affine type flag into the bitstream.

In a fifth implementation form of the method according to the sixteenth aspect as such or any preceding implementation form of the sixteenth aspect, the affine inter flag is conditionally signaled based on the third value, and wherein the affine type flag is conditionally signaled based on the fourth value.

A seventeenth aspect relates to an apparatus comprising a memory; and a processor coupled to the memory and configured to perform any of the first aspect as such or any preceding implementation form of the sixteenth aspect.

An eighteenth aspect relates to a computer program product comprising computer-executable instructions stored on a non-transitory medium that when executed by a processor cause an apparatus to perform any of the first aspect as such or any preceding implementation form of the sixteenth aspect.

A nineteenth aspect relates to a method comprising receiving a bitstream comprising an SPS affine inter flag and an SPS affine type flag; determining, based on a first value of the SPS affine inter flag, whether a slice affine inter flag is presented in slice-segment-header-level syntax and whether syntax elements of a video sequence shall be constrained such that affine inter mode is used in decoding of a video sequence; and determining, based on a second value of the SPS affine type flag, whether a slice affine type flag is presented in slice-segment-header-level syntax and whether syntax elements of a video sequence shall be constrained such that a 6-parameter affine mode is used in decoding of the video sequence. The method provides for more efficient coding of affine models and for coding of the translation model.

In a first implementation form of the method according to the nineteenth aspect as such, the SPS affine type flag is conditionally signaled based on the first value.

In a second implementation form of the method according to the nineteenth aspect as such or any preceding implementation form of the nineteenth aspect, the bitstream further comprises a slice affine inter flag and a slice affine type flag, and wherein the method further comprises determining, based on a third value of the slice affine inter flag, whether syntax elements of a current picture shall be constrained such that affine inter mode is used in decoding of the current picture; and determining, based on a fourth value of the slice affine type flag, whether syntax elements of the current picture shall be constrained such that a 6-parameter affine mode is used in decoding of the current picture.

In a third implementation form of the method according to the nineteenth aspect as such or any preceding implementation form of the nineteenth aspect, wherein the slice affine inter flag is conditionally signaled based on the first value, and wherein the slice affine type flag is conditionally signaled based on the second value.

In a fourth implementation form of the method according to the nineteenth aspect as such or any preceding implementation form of the nineteenth aspect, the bitstream further comprises an affine inter flag and an affine type flag, and wherein the method further comprises determining, based on a fifth value of the affine inter flag, whether affine-model-based motion compensation is used to generate prediction samples of a current coding unit; and determining, based on a sixth value of the affine type flag, whether 6-parameter-affine-model-based motion compensation is used to generate prediction samples of the current coding unit.

In a fifth implementation form of the method according to the nineteenth aspect as such or any preceding implementation form of the nineteenth aspect, the affine inter flag is conditionally signaled based on the third value, and wherein the affine type flag is conditionally signaled based on the fourth value.

A twentieth aspect relates to an apparatus comprising a memory; and a processor coupled to the memory and configured to perform any of the nineteenth aspect as such or any preceding implementation form of the nineteenth aspect.

A twenty-first aspect relates to a computer program product comprising computer-executable instructions stored on a non-transitory medium that when executed by a processor cause an apparatus to perform any of the nineteenth aspect as such or any preceding implementation form of the nineteenth aspect.

A twenty-second aspect relates to a method comprising determining a first value for a motion model indicator variable that specifies a motion model used to generate prediction samples of a current coding unit, wherein the motion model is one of a translational model, a 4-parameter affine model, or a 6-parameter affine model; determining a second value for an affine inter flag based on the first value; encoding the second value for the affine inter flag into a bitstream; determining a third value for an affine type flag based on the first value; and encoding the third value for the affine type flag into the bitstream. The method provides for more efficient coding of affine models and for coding of the translation model.

A twenty-third aspect relates to an apparatus comprising a memory; and a processor coupled to the memory and configured to perform any of the twenty-second aspect as such or any preceding implementation form of the twenty-second aspect.

A twenty-fourth aspect relates to a computer program product comprising computer-executable instructions stored on a non-transitory medium that when executed by a processor cause an apparatus to perform any of the twenty-second aspect as such or any preceding implementation form of the twenty-second aspect.

A twenty-fifth aspect relates to a method comprising receiving a bitstream comprising an affine inter flag and an affine type flag; determining, based on a first value of the affine inter flag and a second value of the affine type flag, a third value of a motion model indicator variable; and determining, based on the third value, whether a motion model is a translational model, a 4-parameter affine model, or a 6-parameter affine model. The method provides for more efficient coding of affine models and for coding of the translation model.

A twenty-sixth aspect relates to an apparatus comprising a memory; and a processor coupled to the memory and configured to perform any of the twenty-fifth aspect as such or any preceding implementation form of the twenty-fifth aspect.

A twenty-seventh aspect relates to a computer program product comprising computer-executable instructions stored on a non-transitory medium that when executed by a processor cause an apparatus to perform any of the twenty-fifth aspect as such or any preceding implementation form of the twenty-fifth aspect.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A is SPS syntax according to an embodiment of the disclosure.

FIG. 4B is SPS syntax according to another embodiment of the disclosure.

FIG. 4C is coding unit syntax according to an embodiment of the disclosure.

FIG. 5A is slice segment header syntax according to an embodiment of the disclosure.

FIG. 5B is slice segment header syntax according to another embodiment of the disclosure.

FIG. 5C is coding unit syntax according to an embodiment of the disclosure.

FIG. 6A is SPS syntax according to an embodiment of the disclosure.

FIG. 6B is SPS syntax according to another embodiment of the disclosure.

FIG. 6C is slice segment header syntax according to an embodiment of the disclosure.

FIG. 6D is coding unit syntax according to an embodiment of the disclosure.

FIG. 7 is coding unit syntax according to an embodiment of the disclosure.

FIG. 8 is a flowchart illustrating a method of determining one or more candidate prediction modes according to an embodiment of the disclosure.

FIG. 9 is a flowchart illustrating a method of encoding a bitstream according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
CPU: central processing unit
DSP: digital signal processor
EO: electrical-to-optical
FPGA: field-programmable gate array
Idc: indicator
MVD: motion vector difference
OE: optical-to-electrical
PPS: picture parameter set
RAM: random-access memory
RBSP: raw byte sequence payload
RF: radio frequency
ROM: read-only memory
RX: receiver unit
SPS: sequence parameter set
SRAM: static RAM
TCAM: ternary content-addressable memory
TX: transmitter unit
VPS: video parameter set.

Figure 1:
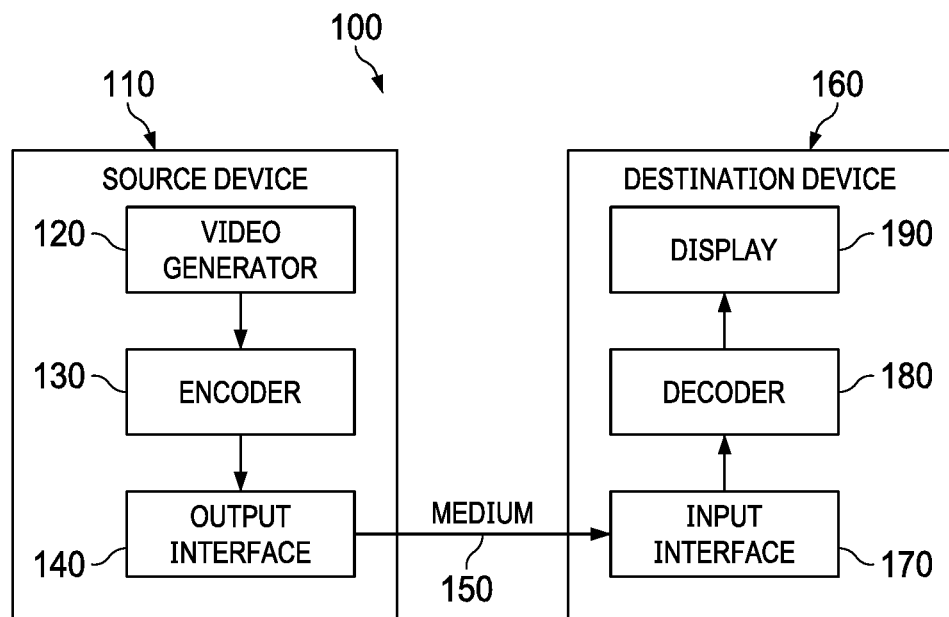
FIG. 1 is a schematic diagram of a coding system.

FIG. 1 is a schematic diagram of a coding system 100. The coding system 100 comprises a source device 110, a medium 150, and a destination device 160. The source device 110 and the destination device 160 are mobile phones, tablet computers, desktop computers, notebook computers, or other devices. The medium 150 is a local network, a radio network, the Internet, or another communications medium.

The source device 110 comprises a video generator 120, an encoder 130, and an output interface 140. The video generator 120 is a camera or another device that generates videos. The encoder 130 may be referred to as a codec. The encoder 130 encodes the videos and other data into bitstreams according to a set of rules. The output interface 140 is an antenna or another component that transmits the bitstreams to the destination device 160. Alternatively, the video generator 120, the encoder 130, and the output interface 140 are in a combination of devices.

The destination device 160 comprises an input interface 170, a decoder 180, and a display 190. The input interface 170 is an antenna or another component that receives the bitstreams from the source device 110. The decoder 180 may also be referred to as a codec. The decoder 180 decodes the videos and other data from the bitstreams according to the set of rules. Together, encoding and decoding are referred to as coding. The display 190 displays the videos. Alternatively, the input interface 170, the decoder 180, and the display 190 are in a combination of devices.

The bitstream comprises data defined at various levels, including slices and blocks. A slice is a spatially distinct region of a video frame that is coded separately from any other region in the video frame. A block is a group of pixels arranged in a rectangle and is the smallest coding unit. Blocks within a slice may be coded in a dependent manner. Though videos are described, videos are series of single frames, so the same concepts apply to single frames.

Objects move among frames, so blocks of those objects move in a corresponding manner. Intra-prediction and inter-prediction are two main ways to represent that movement. Intra-prediction represents a current block in a current frame based on the current block's relationship to a reference block in the current frame. Inter-prediction represents a current block in a current frame based on the current block's relationship to a reference block in a reference frame. Motion vectors describe that relationship. The process of determining those motion vectors is motion estimation, and the process of using those motion vectors in coding is motion compensation. The reference frame can be a previous frame or a forward frame. A P slice uses previous frames for coding, and a B slice uses both previous frames and forward frames for coding.

Translational inter-prediction, or traditional inter-prediction, is used when objects simply move from one position to another position. A translational model implements translational inter-prediction. Affine inter-prediction is used when objects change shapes between frames due to camera zooming, rotation, perspective motion, or other irregular motion. Various affine models implement affine inter-prediction. The translational model and the affine models are types of motion models.

A prediction mode is a coding mode that uses either intra-prediction or inter-prediction to code coding units. Intra mode is a coding mode that uses intra-prediction, and inter mode is a coding mode that uses inter-prediction. Affine merge mode, or affine inter mode, is a type of merge mode that uses an affine model to implement affine inter-prediction.

Figure 2A:
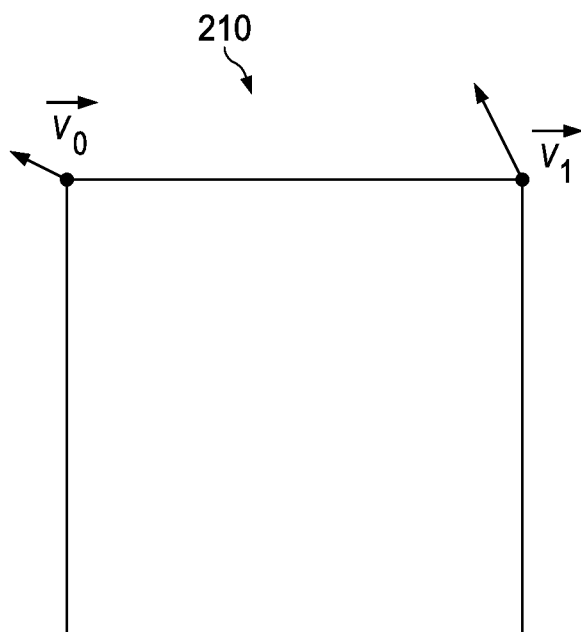
FIG. 2A is a schematic diagram of a current block demonstrating a 4-parameter affine model.

FIG. 2A is a schematic diagram of a current block 210 demonstrating a 4-parameter affine model. The current block 210 comprises a zeroth control point in a top-left corner and corresponding to a motion vector $\vec{v}_0$ and a first control point in a top-right corner and corresponding to a motion vector $\vec{v}_1$. $\vec{v}_0$ and $\vec{v}_1$ have x and y positions and may therefore be represented as $(v_{0x}, v_{0y})$ and $(v_{1x}, v_{1y})$, respectively. The 4-parameter affine model is a motion vector field, which is represented as follows:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x - \frac{(v_{1x} - v_{0x})}{w}y + v_{0y} \end{cases} \quad (1)$$

where w is a width of the current block 210 in pixels and $v_{0x}$, $v_{0y}$, $v_{1x}$, and $v_{1y}$ are the 4 parameters that make up the 4-parameter affine model. Similarly, sub-blocks within the current block 210 may each have a motion vector.

Figure 2B:
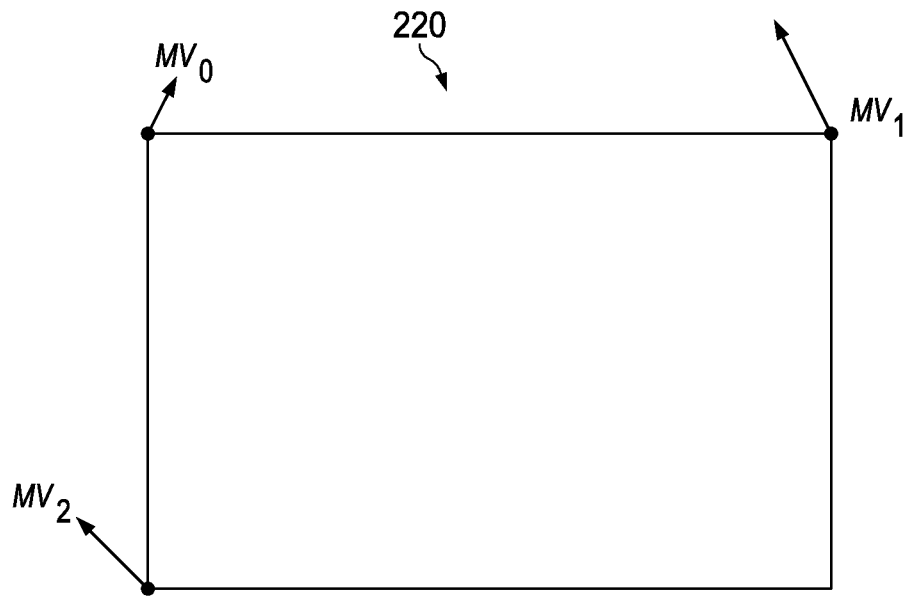
FIG. 2B is a schematic diagram of a current block demonstrating a 6-parameter affine model.

FIG. 2B is a schematic diagram of a current block 220 demonstrating a 6-parameter affine model. The current block 220 comprises a zeroth control point in a top-left corner and corresponding to a motion vector $mv_0$, a first control point in a top-right corner corresponding to a motion vector $mv_1$, and a second control point in a top-left corner and corresponding to a motion vector $mv_2$. $mv_0$, $mv_1$, and $mv_2$ have x and y positions and may therefore be represented as ($mv_0^x$, $mv_0^y$), ($mv_1^x$, $mv_1^y$), and ($mv_2^x$, $mv_2^y$), respectively. The 6-parameter affine model is a motion vector field, which is represented as follows:

$$\begin{cases} mv^x = \frac{(mv_1^x - mv_0^x)}{w}x + \frac{(mv_2^x - mv_0^x)}{h}y + mv_0^x \\ mv^y = \frac{(mv_1^y - mv_0^y)}{w}x + \frac{(mv_2^y - mv_0^y)}{h}y + mv_0^x \end{cases} \quad (2)$$

where w is a width of the current block 220 in pixels, h is a height of the current block 220 in pixels, and $mv_0^x$, $mv_1^x$, $mv_1^y$, and $mv_2^x$, and $mv_2^y$ are the 6 parameters that make up the 6-parameter affine model. Similarly, sub-blocks within the current block 220 may each have a motion vector.

FIGS. 2A-2B demonstrate affine models that use multiple motion vectors in the motion vector fields (1) and (2). However, the translational model uses a single motion vector. Thus, the translational model may be simply $\vec{v_0}$ or $\vec{v_1}$.

Figure 3:
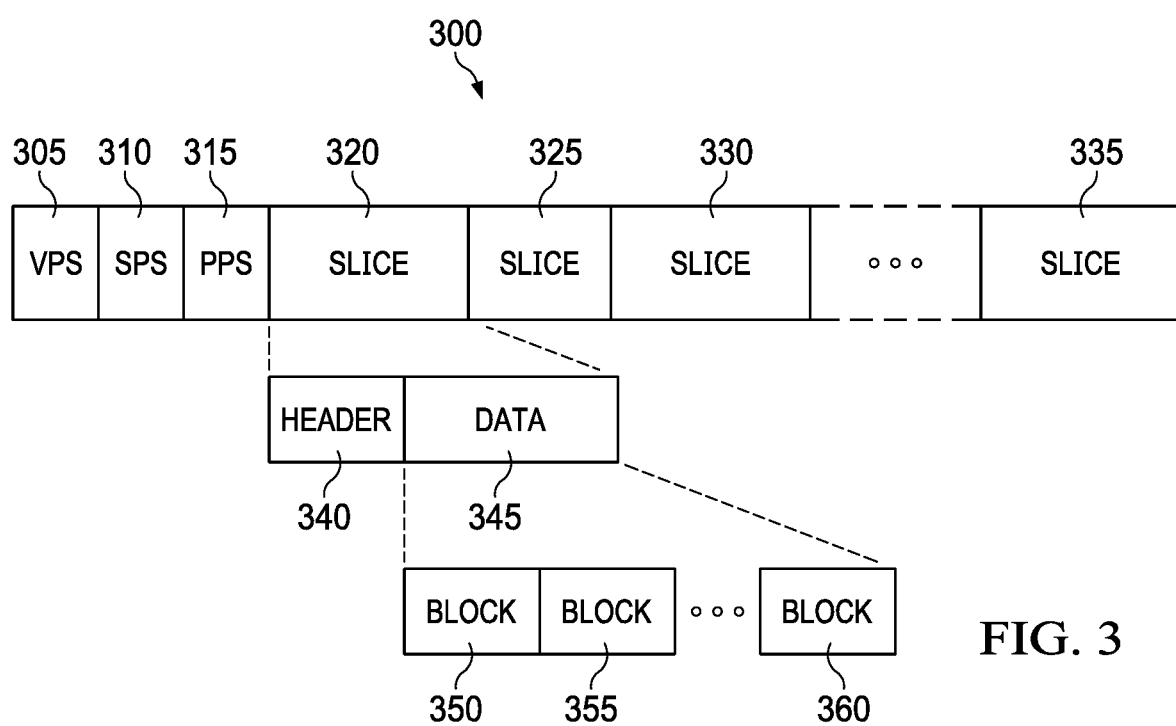
FIG. 3 is a schematic diagram of a video bitstream.

FIG. 3 is a schematic diagram of a video bitstream 300. The video bitstream 300 comprises a VPS 305; an SPS 310; a PPS 315; and at least four slices 320, 325, 330, and 335. The slice 320 comprises a header 340 and data 345. The slices 325, 330, 335 are similar to the slice 320. The data 345 comprise at least three blocks 350, 355, and 360. Though four slices 320-335 are shown, the video bitstream 300 comprises any suitable number of slices. Though three blocks 350-360 are shown, the data 345 comprise any suitable number of blocks. In addition, each remaining slice 325, 330, 335 also comprises blocks. Thus, while the video bitstream 300 comprises numerous blocks, the video bitstream 300 comprises one SPS 310 and significantly fewer slice headers than blocks.

One approach is to always code two flags into each block 350-360. A first flag specifies whether the block 350-360 uses an affine model. A second flag specifies whether the affine model is the 4-parameter affine model or the 6-parameter affine model. However, always including the first flag and the second flag in each block 350-360 requires excessive bits because there are numerous such blocks and not all blocks will use an affine model. It is therefore desirable to more efficiently code affine models. It is also desirable to code the translation model.

Disclosed herein are embodiments for motion model signaling. The motion models include the translational model, the 4-parameter affine model, and the 6-parameter affine model. The motion model signaling is at higher levels of a video bitstream, including the SPS and the slice header. When the higher-level signaling specifies no motion model is used, then lower-level signaling need not specify motion modeling. By reducing the lower-level signaling, the video bitstream requires fewer bits to signal or not signal the motion models. As a result, communication of the video bitstream requires less bandwidth. Though the SPS and the slice header are described, the same concepts apply to other higher levels of the video bitstream. Though the translational model, the 4-parameter affine model, and the 6-parameter affine model are described, the same concepts apply to other motion models specifically and other context models generally.

FIG. 4A is SPS syntax 410 according to an embodiment of the disclosure. The encoder 130 encodes, and the decoder 180 decodes, the SPS 310 using the SPS syntax 410. The SPS syntax 410 comprises an SPS affine inter flag, Sps_affine_inter_flag, and an SPS affine type flag, Sps_affine_type_flag.

Sps_affine_inter_flag specifies whether an affine inter flag, affine_inter_flag, is presented in coding-unit-level syntax. Sps_affine_inter_flag equal to 0 specifies that affine_inter_flag is not presented in the coding-unit-level syntax. Sps_affine_inter_flag equal to 1 specifies that affine_inter_flag is presented in the coding-unit-level syntax.

Sps_affine_type_flag specifies whether an affine type flag, affine_type_flag, is presented in coding-unit-level syntax. Sps_affine_type_flag equal to 0 specifies that affine_inter_flag is not presented in the coding-unit-level syntax. Sps_affine_type_flag equal to 1 specifies that affine_type_flag is presented in the coding-unit-level syntax. Sps_affine_type_flag is conditionally signaled so that when Sps_affine_inter_flag is equal to 0, Sps_affine_type_flag is not signaled, and when Sps_affine_inter_flag is equal to 1, Sps_affine_type_flag is signaled.

FIG. 4B is SPS syntax 420 according to another embodiment of the disclosure. The SPS syntax 420 is similar to the SPS syntax 410 in FIG. 4A. However, unlike in the SPS syntax 410, Sps_affine_type_flag in the SPS syntax 420 is not conditionally signaled. Instead, Sps_affine_type_flag is always signaled, even when Sps_affine_type_flag is equal to 0.

FIG. 4C is coding unit syntax 430 according to an embodiment of the disclosure. The encoder 130 encodes, and the decoder 180 decodes, the blocks 350-360 using the coding unit syntax 430. The coding unit syntax 430 comprises an affine inter flag, affine_type_flag, and an affine type flag, affine_type_flag.

affine_type_flag specifies whether, for a current coding unit, when decoding a P or B slice, affine-model-based motion compensation is used to generate prediction samples of the current coding unit. affine_type_flag equal to 0 specifies that, for the current coding unit, when decoding a P or B slice, affine-model-based motion compensation is not used to generate the prediction samples of the current coding unit. affine_type_flag equal to 1 specifies that, for the current coding unit, when decoding a P or B slice, affine-model-based motion compensation is used to generate the prediction samples of the current coding unit. affine_type_flag is conditionally signaled so that, when Sps_affine_type_flag in the SPS syntax 410 or the SPS syntax 420 is equal to 0, affine inter flag is not signaled, and when Sps_affine_inter_flag in the SPS syntax 410 or the SPS syntax 420 is equal to 1, affine_type_flag is signaled.

affine_type_flag specifies whether, for a current coding unit, when decoding a P or B slice, 6-parameter-affine-model-based motion compensation is used to generate prediction samples of the current coding unit. affine_type_flag equal to 0 specifies that, for the current coding unit, when decoding a P or B slice, 4-parameter-affine-model-based motion compensation is used to generate the prediction samples of the current coding unit. affine_type_flag equal to 1 specifies that, for the current coding unit, when decoding a P or B slice, 6-parameter-affine-model-based motion compensation is used to generate the prediction samples of the current coding unit. affine_type_flag is conditionally signaled so that, when Sps_affine_type_flag in the SPS syntax 410 or the SPS syntax 420 is equal to 0 or when affine_type_flag in the coding unit syntax 430 is equal to 0, affine_type_flag is not signaled, and when Sps_affine_type_flag in the SPS syntax 410 or the SPS syntax 420 is equal to 1 and when affine_type_flag in the coding unit syntax 430 is equal to 1, affine_type_flag is signaled.

FIG. 5A is slice segment header syntax 510 according to an embodiment of the disclosure. The encoder 130 encodes, and the decoder 180 decodes, the header 340 using the slice segment header syntax 510. The slice segment header syntax 510 comprises a slice affine inter flag, Slice_affine_inter_flag, and a slice affine type flag, Slice_affine_inter_flag.

Slice_affine_inter_flag specifies whether syntax elements of a current picture shall be constrained such that affine inter mode is used in decoding of the current picture. Slice_affine_inter_flag equal to 0 specifies that syntax elements of the current picture shall be constrained such that no affine inter mode is used in decoding of the current picture. Slice_affine_inter_flag equal to 1 specifies that syntax elements of the current picture shall be constrained such that affine inter mode is used in decoding of the current picture.

Slice_affine_inter_flag specifies whether syntax elements of a current picture shall be constrained such that a 6-parameter affine mode is used in decoding of the current picture. Slice_affine_inter_flag equal to 0 specifies that syntax elements of the current picture shall be constrained such that no 6-parameter affine mode is used in decoding of the current picture. Slice_affine_inter_flag equal to 1 specifies that syntax elements of the current picture shall be constrained such that the 6-parameter affine mode is used in decoding of the current picture. Slice_affine_inter_flag is conditionally signaled so that when Slice_affine_inter_flag is equal to 0, Slice_affine_inter_flag is not signaled, and when Slice_affine_inter_flag is equal to 1, Slice_affine_inter_flag is signaled.

FIG. 5B is slice segment header syntax 520 according to another embodiment of the disclosure. The slice segment header syntax 520 is similar to the slice segment header syntax 510 in FIG. 5A. However, unlike in the slice segment header syntax 510, Slice_affine_inter_flag in the slice segment header syntax 520 is not conditionally signaled. Instead, Slice_affine_inter_flag is always signaled, even when Slice_affine_inter_flag is equal to 0.

FIG. 5C is coding unit syntax 530 according to an embodiment of the disclosure. The encoder 130 encodes, and the decoder 180 decodes, the blocks 350-360 using the coding unit syntax 530. The coding unit syntax 530 comprises an affine inter flag, affine_inter_flag, and an affine type flag, affine_inter_flag.

affine_inter_flag specifies whether, for a current coding unit, when decoding a P or B slice, affine-model-based motion compensation is used to generate prediction samples of the current coding unit. affine_inter_flag equal to 0 specifies that, for the current coding unit, when decoding a P or B slice, affine-model-based motion compensation is not used to generate the prediction samples of the current coding unit. affine_inter_flag equal to 1 specifies that, for the current coding unit, when decoding a P or B slice, affine-model-based motion compensation is used to generate the prediction samples of the current coding unit. affine_inter_flag is conditionally signaled so that, when Slice_affine_inter_flag in the slice segment header syntax 510 or the slice segment header syntax 520 is equal to 0, affine_inter_flag is not signaled, and when Slice_affine_inter_flag in the slice segment header syntax 510 or the slice segment header syntax 520 is equal to 1, affine_inter_flag is signaled.

affine_inter_flag specifies whether, for a current coding unit, when decoding a P or B slice, 6-parameter-affine-model-based motion compensation is used to generate prediction samples of the current coding unit. affine_inter_flag equal to 0 specifies that, for the current coding unit, when decoding a P or B slice, 4-parameter-affine-model-based motion compensation is used to generate the prediction samples of the current coding unit. affine_inter_flag to 1 specifies that, for the current coding unit, when decoding a P or B slice, 6-parameter-affine-model-based motion compensation is used to generate the prediction samples of the current coding unit. affine_inter_flag is conditionally signaled so that, when Slice_affine_inter_flag in the slice segment header syntax 510 or the slice segment header syntax 520 is equal to 0 or when affine_inter_flag in the coding unit syntax 530 is equal to 0, affine_inter_flag is not signaled, and when Slice_affine_inter_flag in the slice segment header syntax 510 or the slice segment header syntax 520 is equal to 1 and when affine_inter_flag in the coding unit syntax 530 is equal to 1, affine_inter_flag is signaled.

FIGS. 6A-6D demonstrate a semi-hybrid between FIGS. 4A-4C and FIGS. 5A-5C. FIG. 6A is SPS syntax 610 according to an embodiment of the disclosure. The encoder 130 encodes, and the decoder 180 decodes, the SPS 310 using the SPS syntax 610. The SPS syntax 610 comprises an SPS affine inter flag, Sps_affine_inter_flag, and an SPS affine inter flag, Sps_affine_inter_flag.

Sps_affine_inter_flag specifies whether a slice affine inter flag, Slice_affine_inter_flag, is presented in slice-segment-header-level syntax and whether syntax elements of a video sequence shall be constrained such that affine inter mode is used in decoding of the video sequence. Sps_affine_inter_flagequal to 0 specifies that Slice_affine_inter_flag is not presented in slice-segment-header-level syntax and that syntax elements of the video sequence shall be constrained such that affine inter mode is not used in decoding of the video sequence. Sps_affine_inter_flag equal to 1 specifies that Slice_affine_inter_flag is presented in slice-segment-header-level syntax and that syntax elements of the video sequence shall be constrained such that affine inter mode is used in decoding of the video sequence.

Sps_affine_inter_flag specifies whether a slice affine type flag, Slice_affine_inter_flag, is presented in slice-segment-header-level syntax and whether syntax elements of a video sequence shall be constrained such that a 6-parameter affine mode is used in decoding of the video sequence. Sps_affine_inter_flag equal to 0 specifies that Slice_affine_inter_flag is not presented in slice-segment-header-level syntax and that syntax elements of a video sequence shall be constrained such that a 6-parameter affine mode is not used in decoding of the video sequence. Sps_affine_inter_flag equal to 1 specifies that Slice_affine_inter_flag is presented in slice-segment-header-level syntax and that syntax elements of a video sequence shall be constrained such that a 6-parameter affine mode is used in decoding of the video sequence. Sps_affine_inter_flag is conditionally signaled so that when Sps_affine_inter_flag is equal to 0, Sps_affine_inter_flag is not signaled, and when Sps_affine_inter_flag is equal to 1, Sps_affine_inter_flag is signaled.

FIG. 6B is SPS syntax 620 according to another embodiment of the disclosure. The SPS syntax 620 is similar to the SPS syntax 610 in FIG. 6A. However, unlike in the SPS syntax 610, Sps_affine_inter_flag in the SPS syntax 620 is not conditionally signaled. Instead, Sps_affine_inter_flag is always signaled, even when Sps_affine_inter_flag is equal to 0.

FIG. 6C is slice segment header syntax 630 according to an embodiment of the disclosure. The encoder 130 encodes, and the decoder 180 decodes, the header 340 using the slice segment header syntax 630. The slice segment header syntax 630 comprises a slice affine inter flag, Slice_affine_inter_flag, and a slice affine type flag, Slice_affine_inter_flag.

Slice_affine_inter_flag specifies whether syntax elements of a current picture shall be constrained such that affine inter mode is used in decoding of the current picture. Slice_affine_inter_flag equal to 0 specifies that syntax elements of the current picture shall be constrained such that no affine inter mode is used in decoding of the current picture. Slice_affine_inter_flag equal to 1 specifies that syntax elements of the current picture shall be constrained such that affine inter mode is used in decoding of the current picture. Slice_affine_inter_flag is conditionally signaled so that when Sps_affine_inter_flag in the SPS syntax 610 or the SPS syntax 620 is equal to 0, Slice_affine_inter_flag is not signaled, and when the SPS syntax 610 or the SPS syntax 620 is equal to 1, Slice_affine_inter_flag is signaled.

Slice_affine_inter_flag specifies whether syntax elements of a current picture shall be constrained such that a 6-parameter affine mode is used in decoding of the current picture. Slice_affine_inter_flag equal to 0 specifies that syntax elements of the current picture shall be constrained such that no 6-parameter affine mode is used in decoding of the current picture. Slice_affine_inter_flag equal to 1 specifies that syntax elements of the current picture shall be constrained such that the 6-parameter affine mode is used in decoding of the current picture. Slice_affine_inter_flag is conditionally signaled so that when the Sps_affine_inter_flag in the SPS syntax 610 or the SPS syntax 620 is equal to 0, Slice_affine_inter_flag is not signaled, and when the Sps_affine_inter_flag in the SPS syntax 610 or the SPS syntax 620 is equal to 1, Slice_affine_inter_flag is signaled.

FIG. 6D is coding unit syntax 640 according to an embodiment of the disclosure. The encoder 130 encodes, and the decoder 180 decodes, the blocks 350-360 using the coding unit syntax 640. The coding unit syntax 640 comprises an affine inter flag, affine_inter_flag, and an affine type flag, affine_inter_flag.

affine_inter_flag specifies whether, for a current coding unit, when decoding a P or B slice, affine-model-based motion compensation is used to generate prediction samples of the current coding unit. affine_inter_flag equal to 0 specifies that, for the current coding unit, when decoding a P or B slice, affine-model-based motion compensation is not used to generate the prediction samples of the current coding unit. affine_inter_flag equal to 1 specifies that, for the current coding unit, when decoding a P or B slice, affine-model-based motion compensation is used to generate the prediction samples of the current coding unit. affine_inter_flag is conditionally signaled so that, when Slice_affine_inter_flag in the slice segment header syntax 630 is equal to 0, affine_inter_flag is not signaled, and when Slice_affine_inter_flag in the slice segment header syntax 630 is equal to 1, affine_inter_flag is signaled.

affine_inter_flag specifies whether, for a current coding unit, when decoding a P or B slice, 6-parameter-affine-model-based motion compensation is used to generate prediction samples of the current coding unit. affine_inter_flag equal to 0 specifies that, for the current coding unit, when decoding a P or B slice, 4-parameter-affine-model-based motion compensation is used to generate the prediction samples of the current coding unit. affine_inter_flag equal to 1 specifies that, for the current coding unit, when decoding a P or B slice, 6-parameter-affine-model-based motion compensation is used to generate the prediction samples of the current coding unit. affine_inter_flag is conditionally signaled so that, when Slice_affine_inter_flag in the slice segment header syntax 630 is equal to 0 or when affine_inter_flag in the coding unit syntax 640 is equal to 0, affine_inter_flag is not signaled, and when Slice_affine_inter_flag in the slice segment header syntax 630 is equal to 1 and when affine_inter_flag in the coding unit syntax 640 is equal to 1, affine_inter_flag is signaled.

FIG. 7 is coding unit syntax 700 according to an embodiment of the disclosure. The encoder 130 encodes, and the decoder 180 decodes, the blocks 350-360 using the coding unit syntax 700. The coding unit syntax 700 comprises a motion model indicator variable, motion_model_indicator[x0][y0], and an MVD coding instruction, mvd_coding(x0, y0, refList, cpIdx).

motion_model_indicator[x0][y0] specifies a motion model used to generate prediction samples of a current coding unit. The syntax 700 sets motion_model_indicator[x0][y0] equal to a sum of an affine inter flag, affine_inter_flag, and an affine type flag, affine_inter_flag. affine_inter_flag and affine_inter_flag may be from the coding unit syntaxes 430, 530, 640 or elsewhere. As shown in Table 1, motion model indicator[x0][y0] has a value of 0, 1, or 2. A 0 value specifies the translational motion model, a value of 1 specifies the 4-parameter affine mode, and a value of 2 specifies the 6-parameter affine model.

TABLE 1

| Values for motion_model_indicator[ x0 ][ y0 ]. | | | |
|---|---|---|---|
| affine_inter_flag | affine_type_flag | motion_model_indicator[ x0 ][ y0 ] | Motion Model |
| 0 | 0 | 0 | translational |
| 0 | 1 | 1 | 4-parameter |
| 1 | 0 | 1 | 4-parameter |
| 1 | 1 | 2 | 6-parameter |

Alternatively, the values for motion_model_indicator[x0][y0] specify the translational motion model, the 4-parameter affine model, and the 6-parameter affine model in another suitable manner.

mvd_coding(x0, y0, refList, cpIdx) specifies how to code an MVD for a current coding unit. An MVD is a difference between a predicted motion vector and a current motion vector. Thus, the encoder 130 encodes, and the decoder 180 decodes, an MVD instead of a full motion vector field like the motion vector fields (1), (2). x0 and y0 specify a position of a current coding unit. refList specifies reference picture list List0 or List1. The availability of List0 and List1 provides for bi-prediction with a first reference block in List0 and a second reference block in List1. cpIdx specifies a control point index that indicates a control point, for instance, one of the control points in FIG. 2A or 2B. In the coding unit syntax 700, mvd_coding(x0, y0, refList, cpIdx) takes the form of mvd_coding(x0, y0, 0, 1) indicating an MVD coding instruction for List0 and control point 1, mvd_coding(x0, y0, 0, 2) indicating an MVD coding instruction for List0 and control point 2, mvd_coding(x0, y0, 1, 1) indicating an MVD coding instruction for List1 and control point 1, and mvd_coding(x0, y0, 1, 2) indicating an MVD coding instruction for List1 and control point 2.

FIG. 8 is a flowchart illustrating a method 800 of determining one or more candidate prediction modes according to an embodiment of the disclosure. The encoder 130 or the decoder 180 performs the method 800. The encoder 130 or the decoder 180 may be in a processor as described below. At step 810, a first indicator is derived by parsing a bitstream. The first indicator specifies whether any affine model is a candidate motion model for an image block in a preset area. For instance, the first indicator is Sps_affine_inter_flag in the SPS syntax 410, 420, 610, or 620; affine_inter_flag in the coding unit syntax 430, 530, 640, or 700; or Slice_affine_inter_flag in the slice segment header syntax 510, 520, or 630. At step 820, a presence of the first indicator is determined. For instance, Sps_affine_inter_flag in the SPS syntax 410, 420, 610, or 620; affine_inter_flag in the coding unit syntax 430, 530, 640, or 700; or Slice_affine_inter_flag in the slice segment header syntax 510, 520, or 630 is set to 1. At step 830, a second indicator is derived, in response to determining the presence of the first indicator, by parsing the bitstream. The second indicator specifies whether a 6-parameter affine model is a candidate motion model for the image block. For instance, the second indicator is Sps_affine_type_flag in the SPS syntax 410, 420, 610, or 620; affine_type_flag in the coding unit syntax 430, 530, 640, or 700; or Slice_affine_type_flag in the slice segment header syntax 510, 520, or 630. Finally, at step 840, one or more candidate motion models are determined for the image block based on the first indicator and the second indicator. For instance, the encoder 130 or the decoder 180 determines the translation model, the 4-parameter affine model, or the 6-parameter affine model. The method 800 may comprise additional steps as follows.

Before deriving the second indicator, the method 800 further comprises determining that an affine model is the candidate motion model. The method 800 further comprises further deriving the second indicator in response to determining that the affine model is the candidate motion model.

In the method 800, deriving the first indicator comprises parsing an SPS of a sequence of the bitstream. The preset area comprises the sequence, any slice in the sequence, or any coding unit in the sequence. Deriving the second indicator comprises parsing the SPS. Optionally, the method 800 further comprises deriving, in response to an affine model being the candidate motion model, a sixth indicator by parsing a slice header of a slice in the sequence. The sixth indicator specifies whether any affine model is a candidate motion model for the image block in the slice. Optionally, the method 800 further comprises deriving, in response to the 6-parameter affine model being the candidate motion model, a seventh indicator by parsing a slice header of a slice in the sequence. The seventh indicator specifies whether the 6-parameter affine model is a candidate prediction model for the image block in the slice.

The method 800 further comprises further deriving the first indicator by parsing a slice header of a slice of the bitstream. The preset area comprises the slice or any coding unit in the slice. The method 800 further comprises further deriving the second indicator by parsing the slice header.

The method 800 further comprises deriving, in response to an affine model being the candidate motion model, a third indicator by parsing the bitstream. The third indicator specifies whether a prediction mode of the image block is an affine merge mode.

In response to an affine model being the candidate motion model, the method 800 further comprises deriving a fourth indicator by parsing the bitstream; determining, in response to the fourth indicator being a first value, that a prediction mode of the image block is not an affine inter mode; and determining, in response to the fourth indicator being a second value, that the prediction mode is an affine inter mode. The affine inter mode is a 6-parameter affine model mode or a 4-parameter affine model mode. In response to the prediction mode being the affine inter mode, the method 800 further comprises deriving a fifth indicator by parsing the bitstream; determining, in response to the fifth indicator being a third value, that the prediction mode is the 6-parameter affine model mode; and determining, in response to the fifth indicator being a fourth value, that the prediction mode is the 4-parameter affine model mode. In response to the first value being 1, the second value being 0, the third value being 0, and the fourth value being 1, the method further comprises deriving a sum value by adding values of the fourth indicator and the fifth indicator; deriving, in response to the sum value being greater than 0, a first set of MVD information by parsing the bitstream; and deriving, in response to the sum value being greater than 1, a second set of MVD information by parsing the bitstream.

FIG. 9 is a flowchart illustrating a method 900 of encoding a bitstream according to an embodiment of the disclosure. The encoder 130 performs the method 900. At step 910, a first value for an SPS affine inter flag that specifies whether an affine inter flag is presented in coding-unit-level syntax is determined. For instance, the SPS_affine_inter_flag is Sps affine inter flag in the SPS syntax 410 or 420. At step 920, the first value for the SPS affine inter flag is encoded into a bitstream. At step 930, a second value for an SPS affine type flag that specifies whether an affine type flag is presented in the coding-unit-level syntax is determined. For instance, the SPS affine type flag is Sps_affine_type_flag in the SPS syntax 410 or 420. Finally, at step 940, the second value for the SPS affine type flag is encoded into the bitstream.

Figure 10:
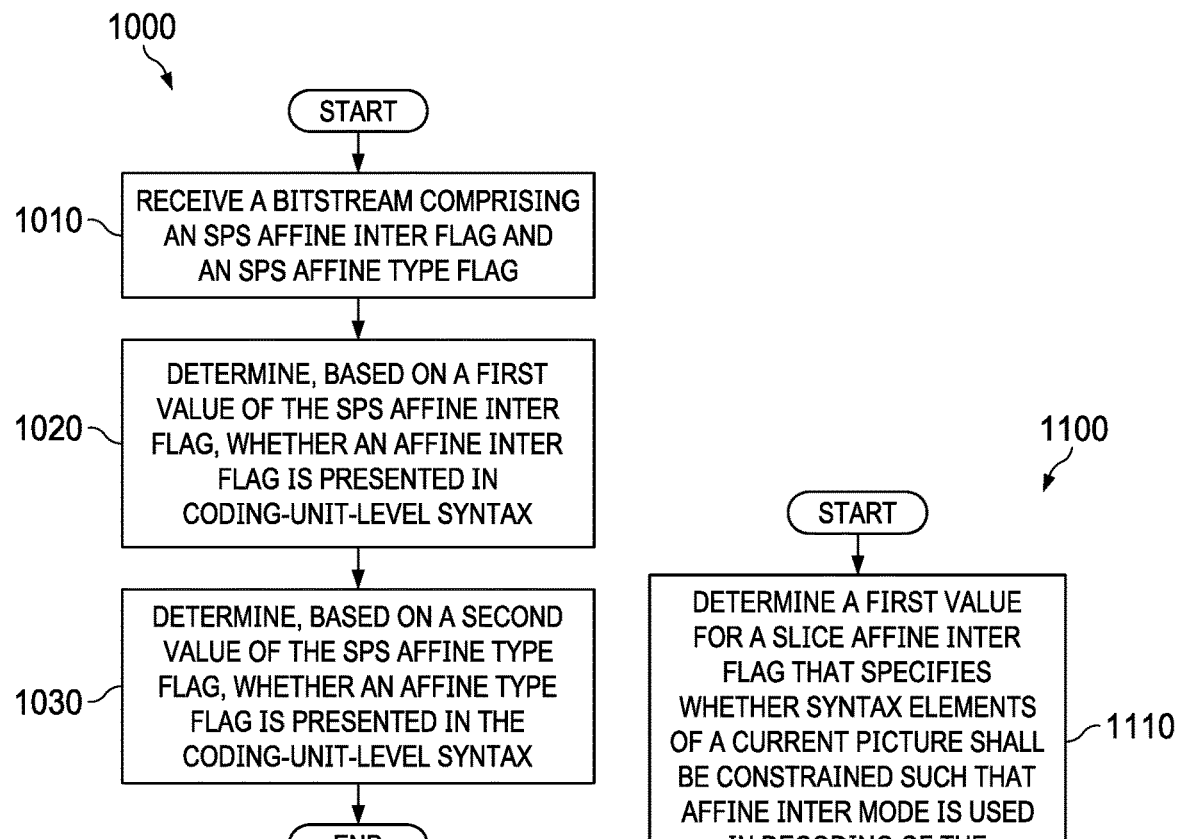
FIG. 10 is a flowchart illustrating a method of decoding a bitstream according to an embodiment of the disclosure.

FIG. 10 is a flowchart illustrating a method 1000 of decoding a bitstream according to an embodiment of the disclosure. The decoder 180 performs the method 1000. At step 1010, a bitstream comprising an SPS affine inter flag and an SPS affine type flag is received. For instance, the SPS affine inter flag is Sps_affine_inter_flag in the SPS syntax 410 or 420, and the SPS affine type flag is Sps_affine_type_flag in the SPS syntax 410 or 420. At step 1020, it is determined, based on a first value of the SPS affine inter flag, whether an affine inter flag is presented in coding-unit-level syntax. Finally, at step 1030, it is determined, based on a second value of the SPS affine type flag, whether an affine type flag is presented in the coding-unit-level syntax.

Figure 11:
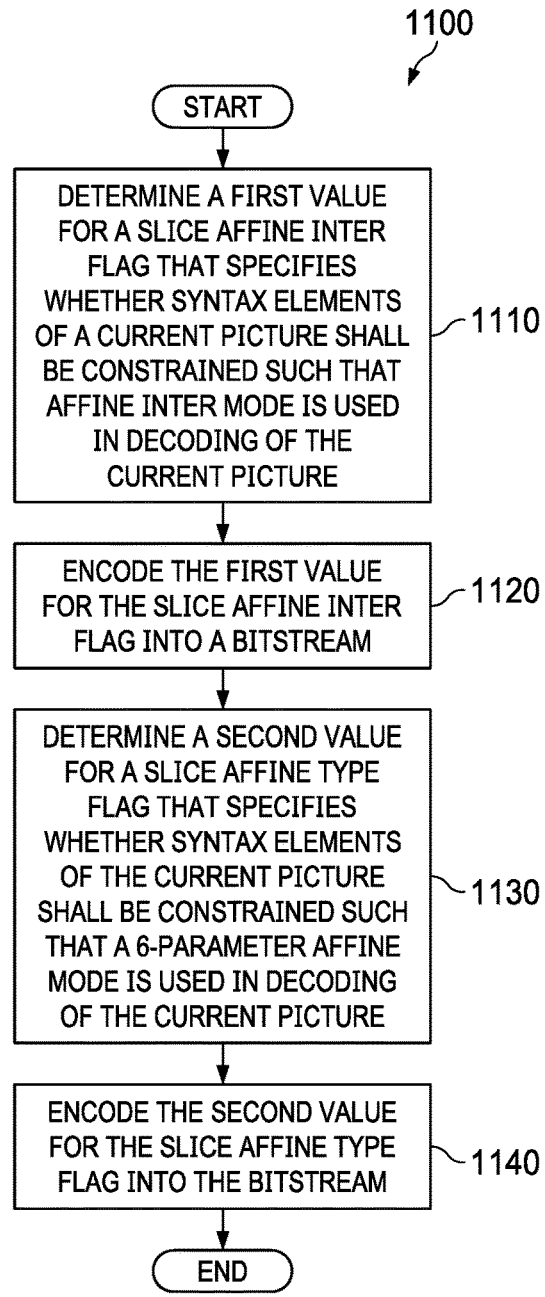
FIG. 11 is a flowchart illustrating a method of encoding a bitstream according to an embodiment of the disclosure.

FIG. 11 is a flowchart illustrating a method 1100 of encoding a bitstream according to an embodiment of the disclosure. The encoder 130 performs the method 1100. At step 1110, a first value for a slice affine inter flag that specifies whether syntax elements of a current picture shall be constrained such that affine inter mode is used in decoding of the current picture is determined. For instance, the slice affine inter flag is Slice_affine_inter_flag in the slice segment header syntax 510 or 520. At step 1120, the first value for the slice affine inter flag is encoded into a bitstream. At step 1130, a second value for a slice affine type flag that specifies whether syntax elements of the current picture shall be constrained such that a 6-parameter affine mode is used in decoding of the current picture is determined. For instance, the slice affine type flag is Slice_affine_type_flag in the slice segment header syntax 510 or 520. Finally, at step 1140, the second value for the slice affine type flag is encoded into the bitstream.

Figure 12:
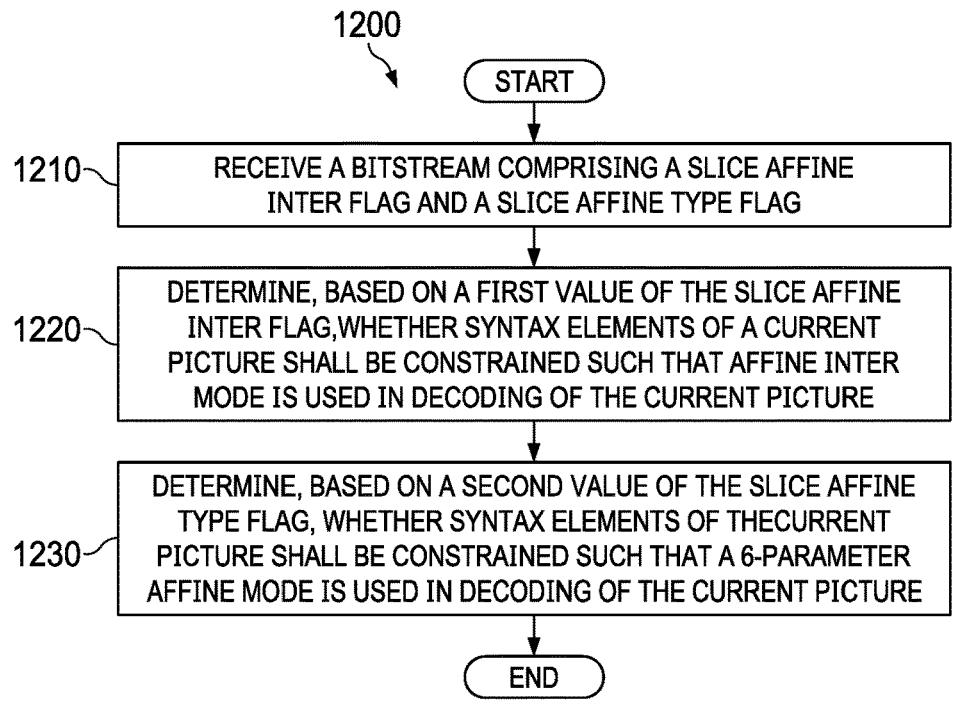
FIG. 12 is a flowchart illustrating a method of decoding a bitstream according to an embodiment of the disclosure.

FIG. 12 is a flowchart illustrating a method 1200 of decoding a bitstream according to an embodiment of the disclosure. The decoder 180 performs the method 1200. At step 1210, a bitstream comprising a slice affine inter flag and a slice affine type flag is received. For instance, the slice affine inter flag is Slice_affine_inter_flag in the slice segment header syntax 510 or 520, and the slice affine type flag is Slice_affine_type_flag in the slice segment header syntax 510 or 520. At step 1220, it is determined, based on a first value of the slice affine inter flag, whether syntax elements of a current picture shall be constrained such that affine inter mode is used in decoding of the current picture. Finally, at step 1230, it is determined, based on a second value of the slice affine type flag, whether syntax elements of the current picture shall be constrained such that a 6-parameter affine mode is used in decoding of the current picture.

Figure 13:
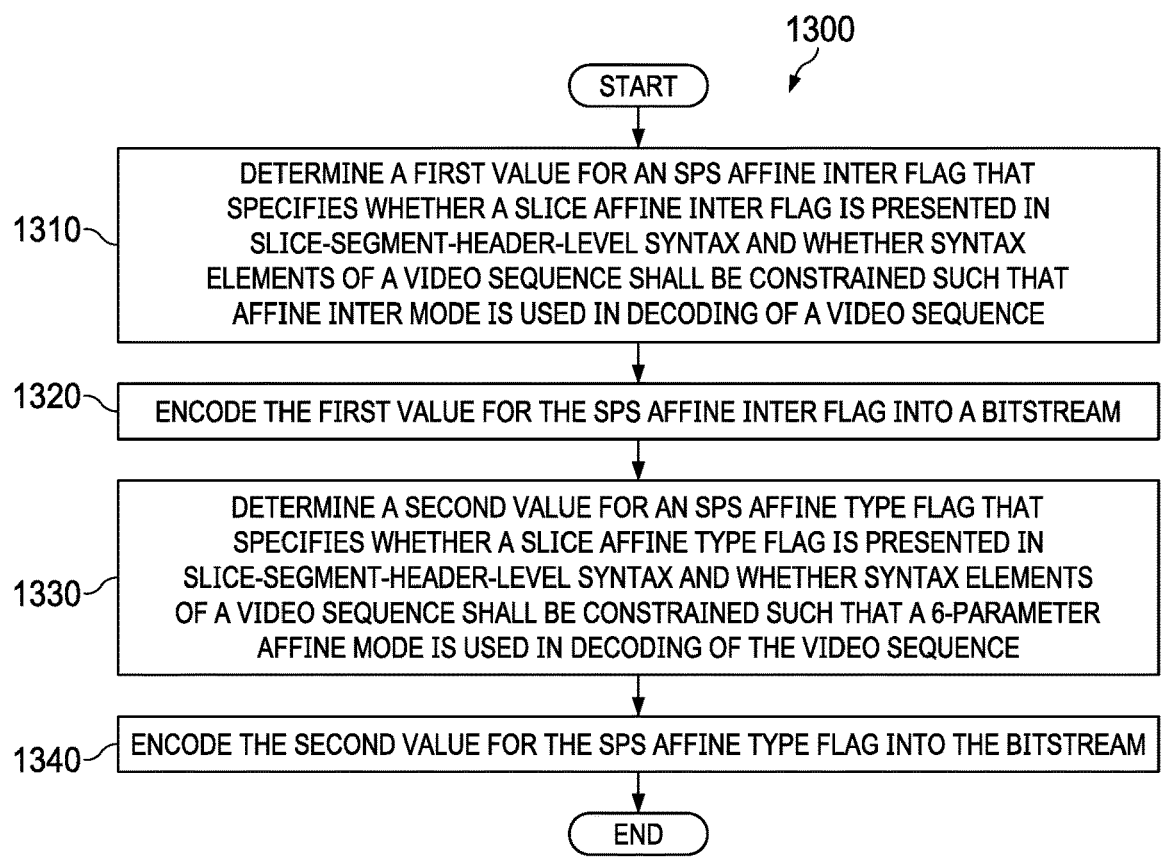
FIG. 13 is a flowchart illustrating a method of encoding a bitstream according to an embodiment of the disclosure.

FIG. 13 is a flowchart illustrating a method 1300 of encoding a bitstream according to an embodiment of the disclosure. The encoder 130 performs the method 1300. At step 1310, a first value for an SPS affine inter flag that specifies whether a slice affine inter flag is presented in slice-segment-header-level syntax and whether syntax elements of a video sequence shall be constrained such that affine inter mode is used in decoding of a video sequence is determined. For instance, the SPS affine inter flag is Sps_affine_inter_flag in the SPS syntax 610 or 620. At step 1320, the first value for the SPS affine inter flag is encoded into a bitstream. At step 1330, a second value for an SPS affine type flag that specifies whether a slice affine type flag is presented in slice-segment-header-level syntax and whether syntax elements of a video sequence shall be constrained such that a 6-parameter affine mode is used in decoding of the video sequence is determined. For instance, the SPS affine type flag is Sps_affine_type_flag in the SPS syntax 610 or 620. Finally, at step 1340, the second value for the SPS affine type flag is encoded into the bitstream.

Figures 14, 15:
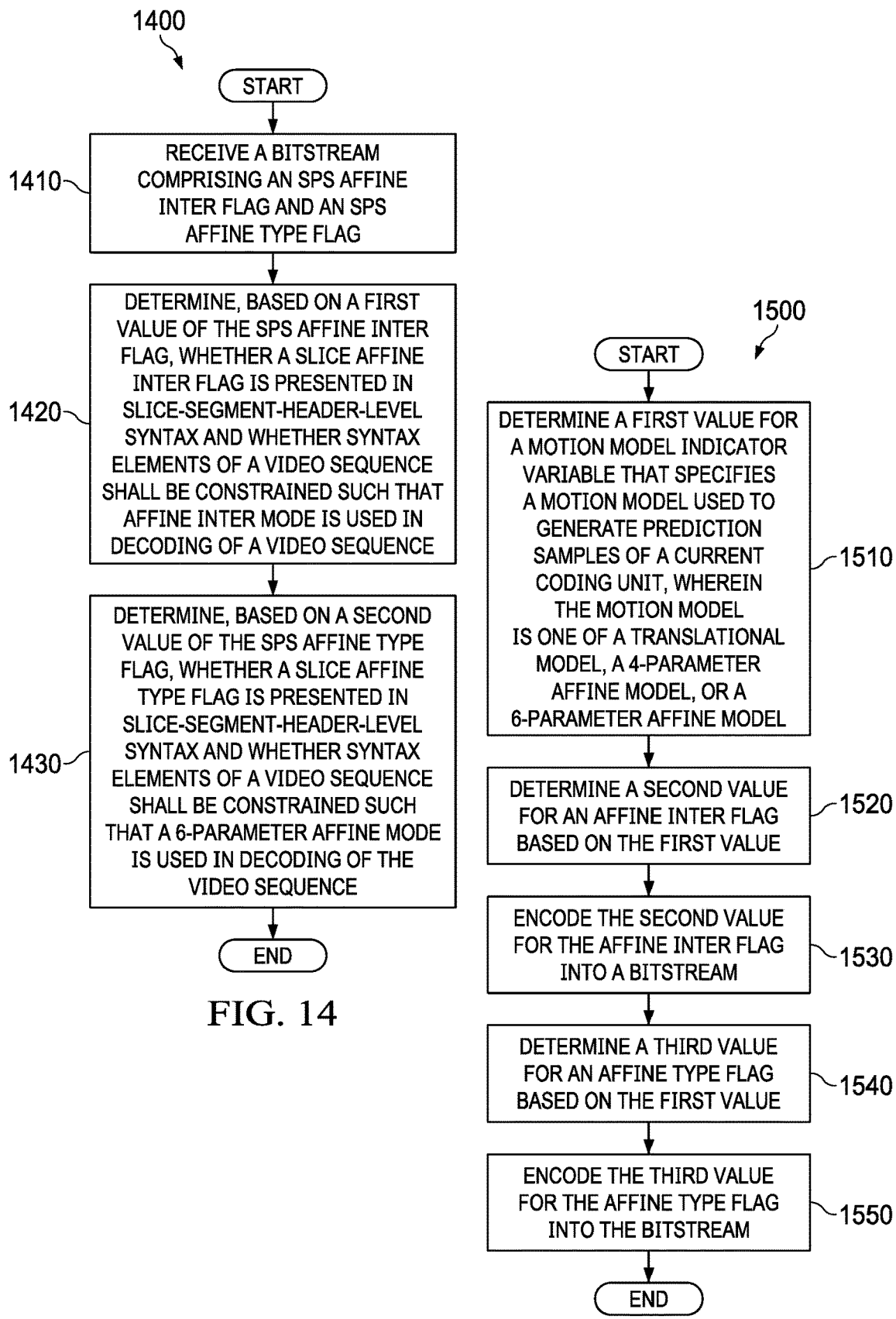
FIG. 14 is a flowchart illustrating a method of decoding a bitstream according to an embodiment of the disclosure.
FIG. 15 is a flowchart illustrating a method of encoding a bitstream according to an embodiment of the disclosure.

FIG. 14 is a flowchart illustrating a method 1400 of decoding a bitstream according to an embodiment of the disclosure. The decoder 180 performs the method 1400. At step 1410, a bitstream comprising an SPS affine inter flag and an SPS affine type flag is received. For instance, the SPS affine inter flag is Sps_affine_inter_flag in the SPS syntax 610 or 620, and the SPS affine type flag is Sps_affine_type_flag in the SPS syntax 610 or 620. At step 1420, it is determined, based on a first value of the SPS affine inter flag, whether a slice affine inter flag is presented in slice-segment-header-level syntax and whether syntax elements of a video sequence shall be constrained such that affine inter mode is used in decoding of a video sequence. Finally, at step 1430, it is determined, based on a second value of the SPS affine type flag, whether a slice affine type flag is presented in slice-segment-header-level syntax and whether syntax elements of a video sequence shall be constrained such that a 6-parameter affine mode is used in decoding of the video sequence.

FIG. 15 is a flowchart illustrating a method 1500 of encoding a bitstream according to an embodiment of the disclosure. The encoder 130 performs the method 1500. At step 1510, a first value for a motion model indicator variable that specifies a motion model used to generate prediction samples of a current coding unit is determined. The motion model is one of a translational model, a 4-parameter affine model, or a 6-parameter affine model. For instance, the motion model indicator variable is motion_model_indicator [x0][y0] in the coding unit syntax 700. At step 1520, a second value for an affine inter flag is determined based on the first value. For instance, the affine inter flag is affine_inter_flag in the coding unit syntax 700. At step 1530, the second value for the affine inter flag is encoded into a bitstream. At step 1540, a third value for an affine type flag is determined based on the first value. For instance, the affine type flag is affine_type_flag in the coding unit syntax 700. Finally, at step 1550, the third value for the affine type flag is encoded into the bitstream.

Figure 16:
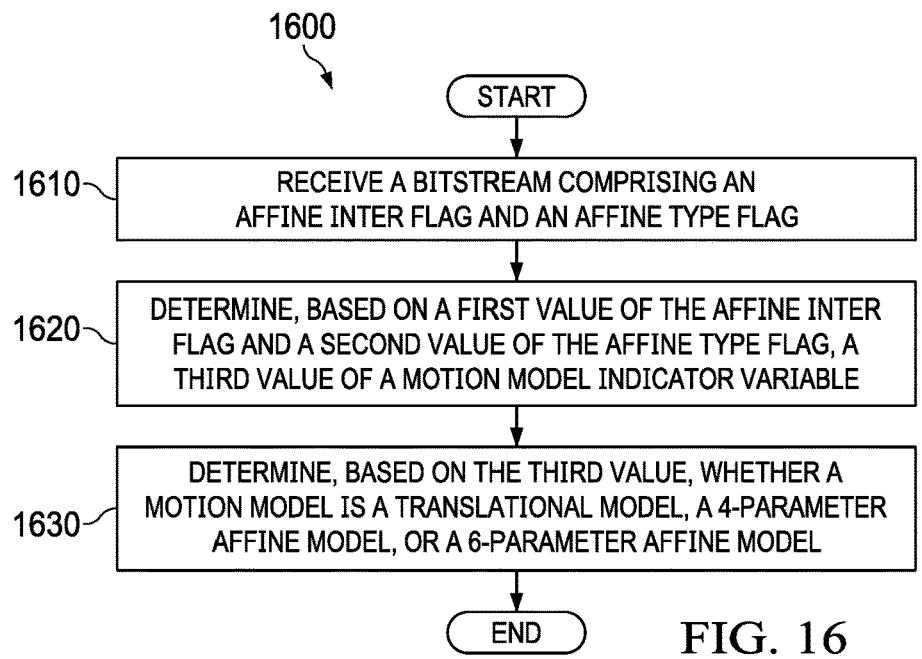
FIG. 16 is a flowchart illustrating a method of decoding a bitstream according to an embodiment of the disclosure.

FIG. 16 is a flowchart illustrating a method 1600 of decoding a bitstream according to an embodiment of the disclosure. The decoder 180 performs the method 1600. At step 1610, a bitstream comprising an affine inter flag and an affine type flag is received. For instance, the affine inter flag is affine_inter_flag in the coding unit syntax 700, and the affine type flag is affine_type_flag in the coding unit syntax 700. At step 1620, it is determined, based on a first value of the affine inter flag and a second value of the affine type flag, a third value of a motion model indicator variable. For instance, the motion model indicator variable is motion_model_indicator[x0][y0] in the coding unit syntax 700. Finally, at step 1630, it is determined, based on the third value, whether a motion model is a translational model, a 4-parameter affine model, or a 6-parameter affine model.

Figure 17:
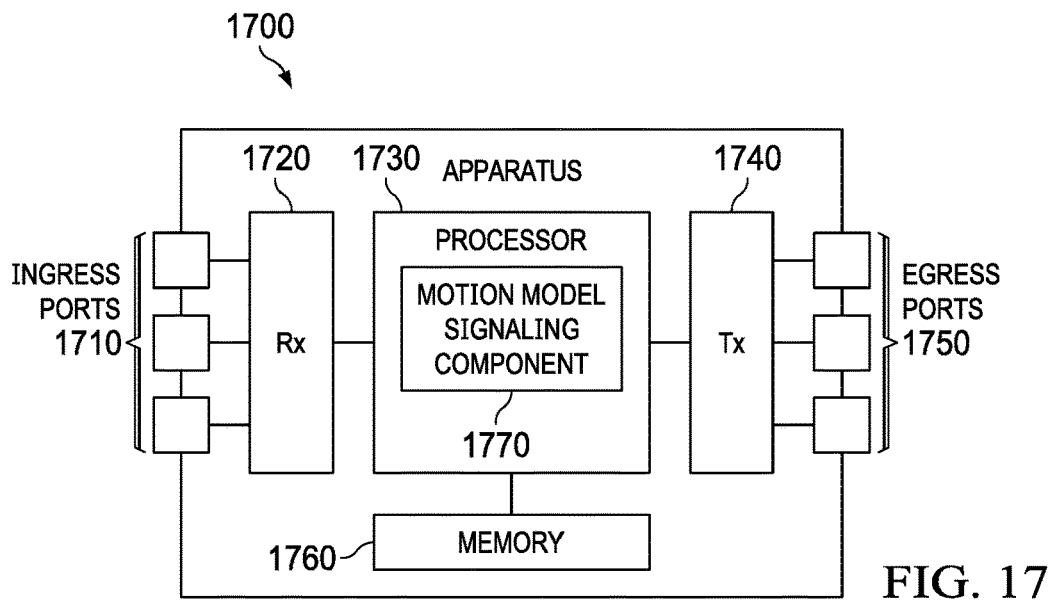
FIG. 17 is a schematic diagram of an apparatus according to an embodiment of the disclosure.

FIG. 17 is a schematic diagram of an apparatus 1700 according to an embodiment of the disclosure. The apparatus 1700 may implement the disclosed embodiments. The apparatus 1700 comprises ingress ports 1710 and an RX 1720 to receive data; a processor, logic unit, baseband unit, or CPU 1730 to process the data; a TX 1740 and egress ports 1750 to transmit the data; and a memory 1760 to store the data. The apparatus 1700 may also comprise OE components, EO components, or RF components coupled to the ingress ports 1710, the RX 1720, the TX 1740, and the egress ports 1750 to provide ingress or egress of optical signals, electrical signals, or RF signals.

The processor 1730 is any combination of hardware, middleware, firmware, or software. The processor 1730 comprises any combination of one or more CPU chips, cores, FPGAs, ASICs, or DSPs. The processor 1730 communicates with the ingress ports 1710, the RX 1720, the TX 1740, the egress ports 1750, and the memory 1760. The processor 1730 comprises a motion model signaling component 1770, which implements the disclosed embodiments. The inclusion of the motion model signaling component 1770 therefore provides a substantial improvement to the functionality of the apparatus 1700 and effects a transformation of the apparatus 1700 to a different state. Alternatively, the memory 1760 stores the motion model signaling component 1770 as instructions, and the processor 1730 executes those instructions.

The memory 1760 comprises any combination of disks, tape drives, or solid-state drives. The apparatus 1700 may use the memory 1760 as an over-flow data storage device to store programs when the apparatus 1700 selects those programs for execution and to store instructions and data that the apparatus 1700 reads during execution of those programs. The memory 1760 may be volatile or non-volatile and may be any combination of ROM, RAM, TCAM, or SRAM.

Figure 18:
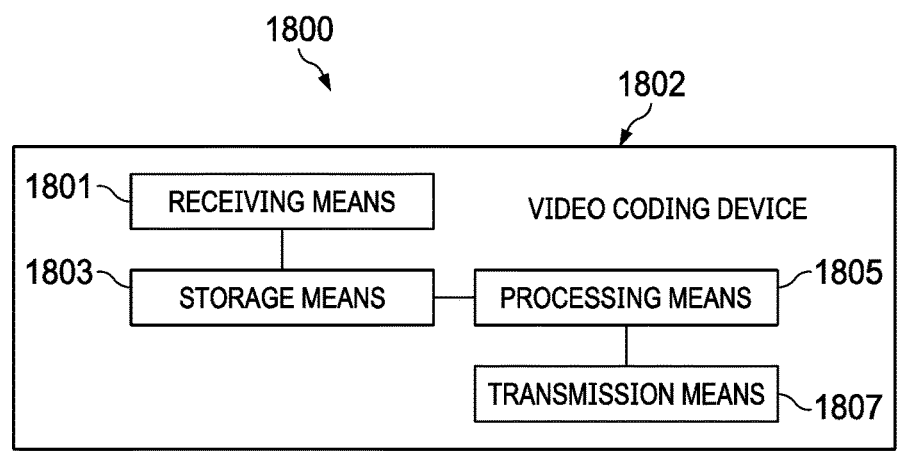
FIG. 18 is a schematic diagram of a coding means.

FIG. 18 is a schematic diagram of a coding means 1800. The coding means 1800 is implemented in a video coding device 1802 (e.g., the encoder 130 or the decoder 180). The video coding device 1802 includes a receiving means 1801. The receiving means 1801 is configured to receive a picture to encode or a bitstream to decode. The video coding device 1802 includes a transmission means 1807 coupled to the receiving means 1801. The transmission means 1807 is configured to transmit the bitstream to a decoder or to transmit a decoded image to a display means (e.g., the display 190).

The video coding device 1802 includes a storage means 1803. The storage means 1803 is coupled to at least one of the receiving means 1801 or the transmission means 1807. The storage means 1803 is configured to store instructions. The video coding device 1802 also includes a processing means 1805. The processing means 1805 is coupled to the storage means 1803. The processing means 1805 is configured to execute the instructions stored in the storage means 1803 to perform the disclosed embodiments.

An apparatus comprises a memory element; and a processor element coupled to the memory element and configured to perform the following method of determining one or more candidate prediction modes: deriving a first indicator by parsing a bitstream, wherein the first indicator specifies whether any affine model is a candidate motion model for an image block in a preset area; deriving a second indicator by parsing the bitstream, wherein the second indicator specifies whether a 6-parameter affine model is a candidate motion model for the image block; and determining one or more candidate prediction modes for the image block based on the first indicator and the second indicator.

1. A method of determining one or more candidate prediction modes, the method comprising: deriving, by a processor, a first indicator by parsing a bitstream, wherein the first indicator specifies whether any affine model is a candidate motion model for an image block in a preset area; determining, by the processor, that the first indicator is set to 1; deriving, by the processor and based on the determination that the first indicator is set to 1, a second indicator by parsing the bitstream, wherein the second indicator specifies whether a 6-parameter affine model is a candidate motion model for the image block; and determining, by the processor, one or more candidate prediction modes for the image block based on the first indicator and the second indicator. 2. The method of claim 1, wherein, before deriving the second indicator, the method further comprises determining that an affine model is the candidate motion model, and wherein the method further comprises further deriving the second indicator in response to determining that the affine model is the candidate motion model. 3. The method of any of claims 1-2, wherein deriving the first indicator comprises parsing an SPS) of a sequence of the bitstream, wherein the preset area comprises the sequence, any slice in the sequence, or any CU in the sequence, and wherein deriving the second indicator comprises parsing the SPS. 4. The method of any of claims 1-3, further comprising deriving, in response to an affine model being the candidate motion model, a sixth indicator by parsing a slice header of a slice in the sequence, wherein the sixth indicator specifies whether any affine model is a candidate motion model for the image block in the slice. 5. The method of any of claims 1-4, further comprising deriving, in response to the 6-parameter affine model being the candidate motion model, a seventh indicator by parsing a slice header of a slice in the sequence, wherein the seventh indicator specifies whether the 6-parameter affine model is a candidate prediction model for the image block in the slice. 6. The method of any of claims 1-5, further comprising: further deriving the first indicator by parsing a slice header of a slice of the bitstream, wherein the preset area comprises the slice or any coding unit in the slice; and further deriving the second indicator by parsing the slice header. 7. The method of any of claims 1-6, further comprising deriving, in response to an affine model being the candidate motion model, a third indicator by parsing the bitstream, wherein the third indicator specifies whether a prediction mode of the image block is an affine merge mode. 8. The method of any of claims 1-7, wherein, in response to an affine model being the candidate motion model, the method further comprises: deriving a fourth indicator by parsing the bitstream; determining, in response to the fourth indicator being a first value, that a prediction mode of the image block is not an affine inter mode; and determining, in response to the fourth indicator being a second value, that the prediction mode is an affine inter mode, wherein the affine inter mode is a 6-parameter affine model mode or a 4-parameter affine model mode. 9. The method of any of claims 1-9, in response to the prediction mode being the affine inter mode, the method further comprises: deriving a fifth indicator by parsing the bitstream; determining, in response to the fifth indicator being a third value, that the prediction mode is the 6-parameter affine model mode; and determining, in response to the fifth indicator being a fourth value, that the prediction mode is the 4-parameter affine model mode. 10. The method of any of claims 1-9, wherein, in response to the first value being 1, the second value being 0, the third value being 0, and the fourth value being 1, the method further comprises: deriving a sum value by adding values of the fourth indicator and the fifth indicator; deriving, in response to the sum value being greater than 0, a first set of MVD information by parsing the bitstream; and deriving, in response to the sum value being greater than 1, a second set of MVD information by parsing the bitstream. 11. An apparatus for determining one or more candidate prediction modes, the apparatus comprising: a memory; and a processor coupled to the memory and configured to perform any of claims 1-10. 12. A computer program product comprising computer-executable instructions stored on a non-transitory medium that when executed by a processor cause an apparatus to perform any of claims 1-10.

13. A method comprising: determining a first value for an SPS affine inter flag that specifies whether an affine inter flag is presented in coding-unit-level syntax; encoding the first value for the SPS affine inter flag into a bitstream; determining a second value for an SPS affine type flag that specifies whether an affine type flag is presented in the coding-unit-level syntax; and encoding the second value for the SPS affine type flag into the bitstream. 14. The method of claim 13, wherein the SPS affine type flag is conditionally signaled based on the first value. 15. The method of any of claims 13-14, further comprising: determining a third value for an affine inter flag that specifies whether affine-model-based motion compensation is used to generate prediction samples of a current coding unit; encoding the third value for the affine inter flag into the bitstream; determining a fourth value for an affine type flag that specifies whether 6-parameter-affine-model-based motion compensation is used to generate prediction samples of the current coding unit; and encoding the fourth value for the affine type flag into the bitstream. 16. The method of any of claims 13-15, wherein the affine inter flag is conditionally signaled based on the first value, and wherein the affine type flag is conditionally signaled based on the second value. 17. An apparatus comprising: a memory; and a processor coupled to the memory and configured to perform any of claims 13-16. 18. A computer program product comprising computer-executable instructions stored on a non-transitory medium that when executed by a processor cause an apparatus to perform any of claims 13-16.

19. A method comprising: receiving a bitstream comprising an SPS affine inter flag and an SPS affine type flag;

determining, based on a first value of the SPS affine inter flag, whether an affine inter flag is presented in coding-unit-level syntax; and determining, based on a second value of the SPS affine type flag, whether an affine type flag is presented in the coding-unit-level syntax. 20. The method of claim 19, wherein the SPS affine type flag is conditionally signaled based on the first value. 21. The method of any of claims 19-20, wherein the bitstream further comprises an affine inter flag and an affine type flag, and wherein the method further comprises: determining, based on a third value of the affine inter flag, whether affine-model-based motion compensation is used to generate prediction samples of a current coding unit; and determining, based on a fourth value of the affine type flag, whether 6-parameter-affine-model-based motion compensation is used to generate prediction samples of the current coding unit. 22. The method of any of claims 19-21, wherein the affine inter flag is conditionally signaled based on the first value, and wherein the affine type flag is conditionally signaled based on the second value. 23. An apparatus comprising: a memory; and a processor coupled to the memory and configured to perform any of claims 19-22. 24. A computer program product comprising computer-executable instructions stored on a non-transitory medium that when executed by a processor cause an apparatus to perform any of claims 19-22.

25. A method comprising: determining a first value for a slice affine inter flag that specifies whether syntax elements of a current picture shall be constrained such that affine inter mode is used in decoding of the current picture; encoding the first value for the slice affine inter flag into a bitstream; determining a second value for a slice affine type flag that specifies whether syntax elements of the current picture shall be constrained such that a 6-parameter affine mode is used in decoding of the current picture; and encoding the second value for the slice affine type flag into the bitstream. 26. The method of claim 24, wherein the slice affine type flag is conditionally signaled based on the first value. 27. The method of any of claims 25-26, further comprising: determining a third value for an affine inter flag that specifies whether affine-model-based motion compensation is used to generate prediction samples of a current coding unit; encoding the third value for the affine inter flag into the bitstream; determining a fourth value for an affine type flag that specifies whether 6-parameter-affine-model-based motion compensation is used to generate prediction samples of the current coding unit; and encoding the fourth value for the affine type flag into the bitstream. 28. The method of any of claims 25-27, wherein the affine inter flag is conditionally signaled based on the first value, and wherein the affine type flag is conditionally signaled based on the second value. 29. An apparatus comprising: a memory; and a processor coupled to the memory and configured to perform any of claims 25-28. 30. A computer program product comprising computer-executable instructions stored on a non-transitory medium that when executed by a processor cause an apparatus to perform any of claims 25-28.

31. A method comprising: receiving a bitstream comprising a slice affine inter flag and a slice affine type flag; determining, based on a first value of the slice affine inter flag, whether syntax elements of a current picture shall be constrained such that affine inter mode is used in decoding of the current picture; and determining, based on a second value of the slice affine type flag, whether syntax elements of the current picture shall be constrained such that a 6-parameter affine mode is used in decoding of the current picture. 32. The method of claim 30, wherein the slice affine type flag is conditionally signaled based on the first value. 33. The method of any of claims 31-32, wherein the bitstream further comprises an affine inter flag and an affine type flag, and wherein the method further comprises: determining, based on a third value of the affine inter flag, whether affine-model-based motion compensation is used to generate prediction samples of a current coding unit; and determining, based on a fourth value of the affine type flag, whether 6-parameter-affine-model-based motion compensation is used to generate prediction samples of the current coding unit. 34. The method of any of claims 31-33, wherein the affine inter flag is conditionally signaled based on the first value, and wherein the affine type flag is conditionally signaled based on the second value. 35. An apparatus comprising: a memory; and a processor coupled to the memory and configured to perform any of claims 31-34. 36. A computer program product comprising computer-executable instructions stored on a non-transitory medium that when executed by a processor cause an apparatus to perform any of claims 31-34.

37. A method comprising: determining a first value for an SPS affine inter flag that specifies whether a slice affine inter flag is presented in slice-segment-header-level syntax and whether syntax elements of a video sequence shall be constrained such that affine inter mode is used in decoding of a video sequence; encoding the first value for the SPS affine inter flag into a bitstream; determining a second value for an SPS affine type flag that specifies whether a slice affine type flag is presented in slice-segment-header-level syntax and whether syntax elements of a video sequence shall be constrained such that a 6-parameter affine mode is used in decoding of the video sequence; and encoding the second value for the SPS affine type flag into the bitstream. 38. The method of claim 37, wherein the SPS affine type flag is conditionally signaled based on the first value. 39. The method of any of claims 37-38, further comprising: determining a third value for a slice affine inter flag that specifies whether syntax elements of a current picture shall be constrained such that affine inter mode is used in decoding of the current picture; encoding the third value for the slice affine inter flag into a bitstream; determining a fourth value for a slice affine type flag that specifies whether syntax elements of the current picture shall be constrained such that a 6-parameter affine mode is used in decoding of the current picture; and encoding the fourth value for the slice affine type flag into the bitstream. 40. The method of any of claims 37-39, wherein the slice affine inter flag is conditionally signaled based on the first value, and wherein the slice affine type flag is conditionally signaled based on the second value. 41. The method of any of claims 37-40, further comprising: determining a fifth value for an affine inter flag that specifies whether affine-model-based motion compensation is used to generate prediction samples of a current coding unit; encoding the fifth value for the affine inter flag into the bitstream; determining a sixth value for an affine type flag that specifies whether 6-parameter-affine-model-based motion compensation is used to generate prediction samples of the current coding unit; and encoding the sixth value for the affine type flag into the bitstream. 42. The method of any of claims 37-41, wherein the affine inter flag is conditionally signaled based on the third value, and wherein the affine type flag is conditionally signaled based on the fourth value. 43. An apparatus comprising: a memory; and a processor coupled to the memory and configured to perform any of claims 37-42. 44. A computer program product comprising computer-executable instructions stored on a non-transitory medium that when executed by a processor cause an apparatus to perform any of claims 37-42.

45. A method comprising: receiving a bitstream comprising an SPS affine inter flag and an SPS affine type flag; determining, based on a first value of the SPS affine inter flag, whether a slice affine inter flag is presented in slice-segment-header-level syntax and whether syntax elements of a video sequence shall be constrained such that affine inter mode is used in decoding of a video sequence; and determining, based on a second value of the SPS affine type flag, whether a slice affine type flag is presented in slice-segment-header-level syntax and whether syntax elements of a video sequence shall be constrained such that a 6-parameter affine mode is used in decoding of the video sequence. 46. The method of claim 44, wherein the SPS affine type flag is conditionally signaled based on the first value. 47. The method of any of claims 45-46, wherein the bitstream further comprises a slice affine inter flag and a slice affine type flag, and wherein the method further comprises: determining, based on a third value of the slice affine inter flag, whether syntax elements of a current picture shall be constrained such that affine inter mode is used in decoding of the current picture; and determining, based on a fourth value of the slice affine type flag, whether syntax elements of the current picture shall be constrained such that a 6-parameter affine mode is used in decoding of the current picture. 48. The method of any of claims 45-47, wherein the slice affine inter flag is conditionally signaled based on the first value, and wherein the slice affine type flag is conditionally signaled based on the second value. 49. The method of any of claims 45-48, wherein the bitstream further comprises an affine inter flag and an affine type flag, and wherein the method further comprises: determining, based on a fifth value of the affine inter flag, whether affine-model-based motion compensation is used to generate prediction samples of a current coding unit; and determining, based on a sixth value of the affine type flag, whether 6-parameter-affine-model-based motion compensation is used to generate prediction samples of the current coding unit. 50. The method of any of claims 45-49, wherein the affine inter flag is conditionally signaled based on the third value, and wherein the affine type flag is conditionally signaled based on the fourth value. 51. An apparatus comprising: a memory; and a processor coupled to the memory and configured to perform any of claims 45-50. 52. A computer program product comprising computer-executable instructions stored on a non-transitory medium that when executed by a processor cause an apparatus to perform any of claims 45-50.

53. A method comprising: determining a first value for a motion model indicator variable that specifies a motion model used to generate prediction samples of a current coding unit, wherein the motion model is one of a translational model, a 4-parameter affine model, or a 6-parameter affine model; determining a second value for an affine inter flag based on the first value; encoding the second value for the affine inter flag into a bitstream; determining a third value for an affine type flag based on the first value; and encoding the third value for the affine type flag into the bitstream. 54. An apparatus comprising: a memory; and a processor coupled to the memory and configured to perform claim 53. 55. A computer program product comprising computer-executable instructions stored on a non-transitory medium that when executed by a processor cause an apparatus to perform claim 53.

56. A method comprising: receiving a bitstream comprising an affine inter flag and an affine type flag; determining, based on a first value of the affine inter flag and a second value of the affine type flag, a third value of a motion model indicator variable; and determining, based on the third value, whether a motion model is a translational model, a 4-parameter affine model, or a 6-parameter affine model. 57. An apparatus comprising: a memory; and a processor coupled to the memory and configured to perform claim 56. 58. A computer program product comprising computer-executable instructions stored on a non-transitory medium that when executed by a processor cause an apparatus to perform claim 56.

1. A method of determining one or more candidate prediction modes, the method comprising: deriving, by a processor, a first indicator by parsing a bitstream, wherein the first indicator specifies whether any affine model is allowed to be a candidate motion model for an image block in a preset area; deriving, by the processor, a second indicator by parsing the bitstream when the first indicator is equal to a first value which indicates an affine model is allowed to be a candidate motion model, wherein the second indicator specifies whether a 6-parameter affine model is allowed to be a candidate motion model for the image block; and determining, by the processor, one or more candidate prediction modes for the image block based on the first indicator and the second indicator. 2. The method of any of claims 1, wherein deriving the first indicator comprises parsing an SPS of a sequence of the bitstream, wherein the preset area comprises the sequence, any slice in the sequence, or any CU in the sequence, and wherein the deriving the second indicator comprises parsing the SPS for deriving the second indicator. 3. The method of any of claims 1-2, further comprising deriving, in response to an affine model being allowed to be the candidate motion model, a sixth indicator by parsing a picture/tile/tile group header of a group of image blocks in the sequence, wherein the sixth indicator specifies whether any affine model is allowed to be a candidate motion model for an image block in the group. 4. The method of any of claims 1-3, further comprising deriving, in response to the 6-parameter affine model being allowed to be the candidate motion model, a seventh indicator by parsing a picture/til /tile group header of a group of image blocks in the sequence, wherein the seventh indicator specifies whether the 6-parameter affine model is a candidate prediction model for the image block in the group. 5. The method of any of claims 1-4, wherein the first indicator and/or second indicator is carried in a picture header of a group of image blocks. 6. The method of any of claims 1-5, further comprising deriving, in response to an affine model being allowed to be the candidate motion model, a third indicator by parsing the bitstream, wherein the third indicator specifies whether a prediction mode of the image block is an affine merge mode. 7. The method of any of claims 1-6, wherein, in response to an affine model being allowed to be the candidate motion model, the method further comprises: deriving a fourth indicator by parsing the bitstream; determining, in response to the fourth indicator being a second value, that a prediction mode of the image block is not an affine inter mode; and determining, in response to the fourth indicator being a first value, that the prediction mode is an affine inter mode, wherein the affine inter mode is a 6-parameter affine model mode or a 4-parameter affine model mode in response to the second indictor being a first value, or the affine inter mode is a 4-parameter affine model mode in response to the second indictor being a second value. 8. The method of any of claims 1-7, in response to the prediction mode being the affine inter mode and the second indicator indicates that the 6-parameter affine model is allowed to be a candidate motion model for the image block, the method further comprises: deriving a fifth indicator by parsing the bitstream; determining, in response to the fifth indicator being a first value, that the prediction mode is the 6-parameter affine model mode; and determining, in response to the fifth indicator being a second value, that the prediction mode is the 4-parameter affine model mode. 9. The method of any of claims 1-8, further comprising deriving, in response to a sum value being greater than 0, a first set of MVD information by parsing the bitstream, wherein the sum value is a sum of the value of the fourth indicator and the value of fifth indicator. 10. The method of any of claims 1-9, further comprising deriving, in response to the sum value being greater than 1, a second set of MVD information by parsing the bitstream, wherein the sum value is a sum of the value of the fourth indicator and the value of fifth indicator. 11. An apparatus for determining one or more candidate prediction modes, the apparatus comprising: a memory; and a processor coupled to the memory and configured to perform any of claims 1-10. 12. A computer program product comprising computer-executable instructions stored on a non-transitory medium that when executed by a processor cause an apparatus to perform any of claims 1-10.

13. A method comprising: encoding a value of affine inter flag in an SPS into a bitstream, wherein the value of the affine inter flag in the SPS specifies whether an affine inter flag is presented in a coding-unit-level syntax; and encoding a value of an SPS affine type flag in to the bitstream, wherein the value affine type flag specifies that an affine type flag is presented in a coding-unit-level syntax. 14. The method of claim 13, wherein the SPS affine type flag is conditionally signaled/encoded based on the value of the SPS affine type flag is first value or second value. 15. The method of any of claims 13-14, further comprising: encoding a value for an affine inter flag that specifies whether an affine model based motion compensation is allowed for generating prediction samples of a current coding unit; and encoding a value for an affine type flag that specifies whether 6-parameter affine-model-based motion compensation is allowed for generating prediction samples of the current coding unit. 16. The method of any of claims 15, wherein the affine inter flag is conditionally signaled based on the value of the affine inter flag is a first value or a second value, and the affine type flag is conditionally signaled based on the value of the affine type flag is a first value or a second value. 17. An apparatus comprising: a memory; and a processor coupled to the memory and configured to perform any of claims 13-16. 18. A computer program product comprising computer-executable instructions stored on a non-transitory medium that when executed by a processor cause an apparatus to perform any of claims 13-16.

19. A method comprising: retrieving an SPS affine inter flag and an SPS affine type flag from a bitstream; determining, based on a value of the SPS affine inter flag, whether an affine inter flag is presented in coding-unit-level syntax; and determining, based on a value of the SPS affine type flag and the affine inter flag in the coding-unit-level syntax, whether an affine type flag is presented in the coding-unit-level syntax. 20. The method of claim 19, wherein the SPS affine type flag is inferred as a second value as if SPS affine type flag can't be successfully retrieved from the bit stream. 21. The method of any of claims 19-20, wherein the method further comprises: retrieving an affine inter flag and an affine type flag from the bitstream, and determining, based on a value of the affine inter flag, whether affine-model-based motion compensation is allowed for generating prediction samples of a current coding unit; and determining, based on a value of the affine type flag, whether 6-parameter-affine-model-based motion compensation is allowed for generating prediction samples of the current coding unit. 22. The method of any of claims 19-21, wherein the affine inter flag is inferred to be a second value if the affine inter flag is not successfully retrieved from the bit stream, and the affine type flag is inferred to be a second value if the affine type flag is not successfully retrieved from the bit stream. 23. An apparatus comprising: a memory; and a processor coupled to the memory and configured to perform any of claims 19-22. 24. A computer program product comprising computer-executable instructions stored on a non-transitory medium that when executed by a processor cause an apparatus to perform any of claims 19-22.

25. A method comprising: determining a first value for a slice affine inter flag that specifies whether syntax elements of a current slice in a current picture shall be constrained such that affine inter mode is used in decoding of the slice associated with the slice affine inter flag; encoding the first value for the slice affine inter flag into a bitstream; determining a second value for a slice affine type flag that specifies whether syntax elements of a current slice in the current picture shall be constrained such that a 6-parameter affine mode is used in decoding of the slice associated with the slice affine type flag; and encoding the second value for the slice affine type flag into the bitstream. 26. The method of claim 25, wherein the slice affine type flag is conditionally signaled/encoded based on the first value. 27. The method of any of claims 25-26, further comprising: determining a third value for an affine inter flag that specifies whether affine-model-based motion compensation is used to generate prediction samples of a current coding unit; encoding the third value for the affine inter flag into the bitstream; determining a fourth value for an affine type flag that specifies whether 6-parameter-affine-model-based motion compensation is used to generate prediction samples of the current coding unit; and encoding the fourth value for the affine type flag into the bitstream. 28. The method of any of claims 25-27, wherein the affine inter flag is conditionally signaled based on the first value, and wherein the affine type flag is conditionally signaled based on the second value. 29. An apparatus comprising: a memory; and a processor coupled to the memory and configured to perform any of claims 26-29. 30. A computer program product comprising computer-executable instructions stored on a non-transitory medium that when executed by a processor cause an apparatus to perform any of claims 26-28.

31. A method comprising: retrieving a slice affine inter flag and a slice affine type flag from a bit stream; determining, based on a value of the slice affine inter flag, whether an affine inter mode is allowed to be used in decoding of the current picture; and determining, based on a value of the slice affine type flag, whether a 6-parameter affine mode is allowed to be used in decoding of the current picture. 32. The method of claim 31, wherein the slice affine type flag is inferred to be a second value when the slice affine type flag is not successfully retrieved from the bitstream. 33. The method of any of claims 31-32, further comprising: retrieving an affine inter flag and affine type flag from a bitstream; determining, based on a value of the affine inter flag, whether affine-model-based motion compensation is allowed to be used to generate prediction samples of a current coding unit; and determining, based on a value of the affine type flag, whether 6-parameter-affine-model-based motion compensation is allowed to be used to generate prediction samples of the current coding unit. 34. The method of any of claims 31-33, wherein the affine inter flag is inferred to be a second value if the affine inter flag is not successfully retrieved from the bit stream, and the affine type flag is inferred to be a second value if the affine type flag is not successfully retrieved from the bit stream. 35. An apparatus comprising: a memory; and a processor coupled to the memory and configured to perform any of claims 32-34. 36. A computer program product comprising computer-executable instructions stored on a non-transitory medium that when executed by a processor cause an apparatus to perform any of claims 32-34.

37. A method comprising: signaling a value for affine inter flag in an SPS, wherein the value for affine inter flag specifies whether an affine inter mode is allowed to be used in decoding of a video sequence or syntax elements of a video sequence shall be constrained such that no affine inter mode is used in decoding of a video sequence; and signaling a value for an SPS affine type flag in a case that the value of affine inter flag specifies an affine inter mode is allowed to be used in decoding a video sequence, wherein the value for the SPS affine type flag specifies a 6-parameter affine mode is allowed to be used in decoding of the video sequence or syntax elements of a video sequence shall be constrained such that no 6-parameter affine mode is used in decoding of the video sequence. 38. The method of claim 37, wherein the SPS affine type flag is conditionally signaled based on the value for the affine inter flag in the SPS is first value or second value, wherein the first value is different from the second value. 39. The method of any of claims 37-38, further comprising: signaling a value for a slice affine inter flag in a slice header, wherein the value for the slice affine inter flag specifies whether an affine inter mode is allowed to be used in decoding of a slice associated with the slice affine inter flag or syntax elements of a video sequence shall be constrained such that no affine inter mode is used in decoding of the slice; and signaling a value for a slice affine type flag in a case that the value of the slice affine inter flag specifies an affine inter mode is allowed to be used in decoding the slice, wherein the value for the slice affine type flag specifies a 6-parameter affine mode is allowed to be used in decoding of the slice or syntax elements of a video sequence shall be constrained such that no 6-parameter affine mode is used in decoding of the slice. 40. The method of any of claims 37-39, wherein the slice affine inter flag is conditionally signaled based on the value for the slice affine inter flag in the SPS is third value or fourth value, wherein the third value is different from the fourth value, wherein the slice affine type flag is conditionally signaled based on the value for the slice affine type flag in the SPS is fifth value or sixth value, wherein the fifth value is different from the sixth value. 41. The method of any of claims 37-40, further comprising: signaling a value for an affine inter flag that specifies whether affine-model-based motion compensation is used to generate prediction samples of a current coding unit by encoding the value for the affine inter flag into the bitstream; and signaling a value for an affine type flag that specifies whether 6-parameter-affine-model-based motion compensation is used to generate prediction samples of the current coding unit by encoding the value for the affine type flag into the bitstream. 42. The method of any of claims 37-41, wherein the affine inter flag is conditionally signaled based on the value for the affine inter flag is first value or second value, and the affine type flag is conditionally signaled based on the value for the affine type flag is first value or second values. 43. An apparatus comprising: a memory; and a processor coupled to the memory and configured to perform any of claims 37-42. 44. A computer program product comprising computer-executable instructions stored on a non-transitory medium that when executed by a processor cause an apparatus to perform any of claims 37-42.

45. A method comprising: retrieving, from a bitstream, an SPS affine inter flag; determining, based on a value of the SPS affine inter flag, whether an affine inter mode is allowed to be used in decoding of a video sequence or syntax elements of a video sequence shall be constrained such that no affine inter mode is used in decoding of a video sequence; retrieving, from the bitstream, an SPS affine type flag in a case in which the affine inter flag; and determining, based on a value of the SPS affine type flag, whether a 6-parameter affine mode is used in decoding of the video sequence or syntax elements of a video sequence shall be constrained such that no 6-parameter affine mode is used in decoding of the video sequence. 46. The method of claim 45, wherein the SPS affine type flag is conditionally signaled based on the value of the SPS affine type flag is a first value or a second value. 47. The method of any of claims 45-46, further comprising: retrieving, from the bitstream, a slice affine inter flag; determining, based on a value of the slice affine inter flag, whether an affine inter mode is allowed to be used in decoding of a slice associated with the slice affine inter flag or syntax elements of the slice shall be constrained such that no affine inter mode is used in decoding of the slice; retrieving, from the bitstream, a slice affine type flag in a case that the value of affine inter flag; and determining, based on a value of the slice affine type flag, whether a 6-parameter affine mode is used in decoding of the slice or syntax elements of the slice shall be constrained such that no 6-parameter affine mode is used in decoding the slice. 48. The method of any of claims 45-46, wherein the slice affine inter flag is conditionally signaled based on the value of the slice affine inter flag is a third value or a fourth value, and wherein the slice affine type flag is conditionally signaled based on the value of the slice affine type flag is a fifth value or a sixth value. 49. The method of any of claims 45-46, wherein the method further comprises: retrieving an affine inter flag from the bitstream; determining, based on a value of the affine inter flag, whether affine-model-based motion compensation is used to generate prediction samples of a current coding unit; retrieving an affine type flag from the bitstream in the case that the affine affine-model-based motion compensation is used to generate prediction samples of the current coding unit; and determining, based on a value of the affine type flag, whether 6-parameter-affine-model-based motion compensation is used to generate prediction samples of the current coding unit. 50. The method of any of claims 45-49, wherein the affine inter flag is inferred to be a second value if the affine inter flag is not successfully retrieved, and the affine type flag is inferred to be a second value if the affine type flag is not successfully retrieved. 51. An apparatus comprising: a memory; and a processor coupled to the memory and configured to perform any of claims 45-50. 52. A computer program product comprising computer-executable instructions stored on a non-transitory medium that when executed by a processor cause an apparatus to perform any of claims 45-50.

53. A method comprising: determining a second value for an affine inter flag; encoding the second value for the affine inter flag into a bitstream; determining a third value for an affine type flag; encoding the third value for the affine type flag into the bitstream; and determining a first value for a motion model indicator variable that specifies a motion model used to generate prediction samples of a current coding unit, wherein the motion model is one of a translational model, a 4-parameter affine model, or a 6-parameter affine model, and the first value for the motion model indicator variable is determined by the sum of the second value for the affine inter flag and the third value for the affine type flag. 54. An apparatus comprising: a memory; and a processor coupled to the memory and configured to perform claim 53. 55. A computer program product comprising computer-executable instructions stored on a non-transitory medium that when executed by a processor cause an apparatus to perform claim 53.

56. A method comprising: receiving a bitstream comprising an affine inter flag and an affine type flag; determining, based on a first value of the affine inter flag and a second value of the affine type flag, a third value of a motion model indicator variable; and determining, based on the third value, whether a motion model is a translational model, a 4-parameter affine model, or a 6-parameter affine model. 57. The method of claim 56, wherein the determining, based on a first value of the affine inter flag and a second value of the affine type flag, a third value of a motion model indicator variable comprises: determining, based on the sum of the first value of the affine inter flag and the second value of the affine type flag, the third value of a motion model indicator variable. 58. An apparatus comprising: a memory; and a processor coupled to the memory and configured to perform claim 56 or 57. 59. A computer program product comprising computer-executable instructions stored on a non-transitory medium that when executed by a processor cause an apparatus to perform claim 56 or 57.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A method implemented by a video decoder and comprising:
receiving a video bitstream comprising a sequence parameter set (SPS) raw byte sequence payload (RBSP), wherein the SPS RBSP comprises a first SPS level flag, wherein the first SPS level flag equal to a first value specifies that an affine inter flag is present in coding unit syntax, and wherein the affine inter flag equal to the first value specifies that for a current coding unit, when decoding a P slice or a B slice, affine model based motion compensation is used to generate a predicted pixel of the current coding unit; and
decoding a video sequence from the video bitstream according to the first SPS level flag.

2. The method of claim 1, wherein the first value is 1.

3. The method of claim 1, wherein the video bitstream further comprises the coding unit syntax, and wherein the coding unit syntax comprises the affine inter flag.

4. The method of claim 1, wherein the affine inter flag equal to a second value specifies that the current coding unit is not predicted by the affine model based motion compensation.

5. A method implemented by a video encoder and comprising:
generating a first sequence parameter set (SPS) level flag, wherein the first SPS level flag equal to a first value specifies that an affine inter flag is present in coding unit syntax, wherein the affine inter flag equal to the first value specifies that for a current coding unit, when decoding a P slice or a B slice, affine model based motion compensation is used to generate a predicted pixel for the current coding unit;
encoding the first SPS level flag into an SPS raw byte sequence payload (RBSP);
encoding the SPS RBSP into a video bitstream; and
storing the video bitstream for transmission to a video decoder.

6. The method of claim 5, wherein the first value is 1.

7. The method of claim 5, further comprising:
encoding the affine inter flag into the coding unit syntax; and
encoding the coding unit syntax into the video bitstream.

8. The method of claim 5, wherein the affine inter flag equal to a second value specifies that the current coding unit is not predicted by the affine model based motion compensation.

9. A device comprising:
a memory configured to store instructions; and
a processor coupled to the memory and configured to execute the instructions to cause the device to:
receive a video bitstream comprising a sequence parameter set (SPS) raw byte sequence payload (RBSP), wherein the SPS RBSP comprises a first SPS level flag, wherein the first SPS level flag equal to a first value specifies that an affine inter flag is present in coding unit syntax, wherein the first SPS level flag equal to a second value specifies that the affine inter flag is not present in the coding unit syntax, and wherein the affine inter flag equal to the first value specifies that for a current coding unit, when decoding a P slice or a B slice, affine model based motion compensation is used to generate a predicted pixel of the current coding unit; and
decode a video sequence from the video bitstream according to the first SPS level flag.

10. The device of claim 9, wherein the first value is 1 and the second value is 0.

11. The device of claim 9, wherein the video bitstream further comprises the coding unit syntax, and wherein the coding unit syntax comprises the affine inter flag.

12. The device of claim 9, wherein the affine inter flag equal to the second value specifies that the current coding unit is not predicted by the affine model based motion compensation.

13. A device comprising:
a memory configured to store instructions; and
a processor coupled to the memory and configured to execute the instructions to cause the device to:
generate a first sequence parameter set (SPS) level flag, wherein the first SPS level flag equal to a first value specifies that an affine inter flag is present in coding unit syntax, wherein the first SPS level flag equal to a second value specifies that the affine inter flag is not present in the coding unit syntax, wherein the affine inter flag equal to the first value specifies that for a current coding unit, when decoding a P slice or a B slice, affine model based motion compensation is used to generate a predicted pixel for the current coding unit;

encode the first SPS level flag into an SPS raw byte sequence payload (RBSP);

encode the SPS RBSP into a video bitstream; and store the video bitstream for transmission to a video decoder.

14. The device of claim 13, wherein the first value is 1 and the second value is 0.

15. The device of claim 13, wherein the processor is further configured to execute the instructions to cause the device to:

encode the affine inter flag into the coding unit syntax; and
encode the coding unit syntax into the video bitstream.

16. The device of claim 13, wherein the affine inter flag equal to the second value specifies that the current coding unit is not predicted by the affine model based motion compensation.

17. A computer program product comprising instructions that are stored on a non-transitory computer-readable medium and that, when executed by a processor, cause a device to:

receive a video bitstream comprising a sequence parameter set (SPS) raw byte sequence payload (RBSP), wherein the SPS RBSP comprises a first SPS level flag, wherein the first SPS level flag equal to a first value specifies that an affine inter flag is present in coding unit syntax, wherein the first SPS level flag equal to a second value specifies that the affine inter flag is not present in the coding unit syntax, and wherein the affine inter flag equal to the first value specifies that for a current coding unit, when decoding a P slice or a B slice, affine model based motion compensation is used to generate a predicted pixel of the current coding unit; and decode a video sequence from the video bitstream according to the first SPS level flag.

18. The computer program product of claim 17, wherein the first value is 1 and the second value is 0.

19. The computer program product of claim 17, wherein the video bitstream further comprises the coding unit syntax, and wherein the coding unit syntax comprises the affine inter flag.

20. The computer program product of claim 17, wherein the affine inter flag equal to the second value specifies that the current coding unit is not predicted by the affine model based motion compensation.

21. A computer program product comprising instructions that are stored on a non-transitory computer-readable medium and that, when executed by a processor, cause a device to:

generate a first sequence parameter set (SPS) level flag, wherein the first SPS level flag equal to a first value specifies that an affine inter flag is present in coding unit syntax, wherein the first SPS level flag equal to a second value specifies that the affine inter flag is not present in the coding unit syntax, wherein the affine inter flag equal to the first value specifies that for a current coding unit, when decoding a P slice or a B slice, affine model based motion compensation is used to generate a predicted pixel for the current coding unit;

encode the first SPS level flag into an SPS raw byte sequence payload (RBSP);

encode the SPS RBSP into a video bitstream; and store the video bitstream for transmission to a video decoder.

22. The computer program product of claim 21, wherein the first value is 1 and the second value is 0.

23. The computer program product of claim 21, wherein the instructions, when executed by the processor, further cause the device to:

encode the affine inter flag into the coding unit syntax; and
encode the coding unit syntax into the video bitstream.

24. The computer program product of claim 21, wherein the affine inter flag equal to the second value specifies that the current coding unit is not predicted by the affine model based motion compensation.

25. The method of claim 1, wherein the first SPS level flag equal to a second value specifies that the affine inter flag is not present in the coding unit syntax.

26. The method of claim 25, wherein the second value is 0.

27. The method of claim 1, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

28. The method of claim 5, wherein the first SPS level flag equal to a second value specifies that the affine inter flag is not present in the coding unit syntax.

29. The method of claim 28, wherein the second value is 0.

30. The method of claim 5, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

31. The device of claim 9, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

32. The device of claim 13, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

33. The computer program product of claim 17, wherein the SPS RB SP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

34. The computer program product of claim 21, wherein the SPS RB SP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

* * * * *

UNITED STATES PATENT AND TRADEMARK OFFICE
CERTIFICATE OF CORRECTION

PATENT NO. : 11,895,313 B2
APPLICATION NO. : 17/585793
DATED : February 6, 2024
INVENTOR(S) : Xiang Ma et al.

It is certified that error appears in the above-identified patent and that said Letters Patent is hereby corrected as shown below:

In the Claims

Column 34, Lines 51-62, Claims 33 and 34, should read:

33. The computer program product of claim 17, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

34. The computer program product of claim 21, wherein the SPS RBSP further comprises a second SPS level flag, wherein the second SPS level flag equal to 1 specifies that affine_type_flag is present in the coding unit syntax, and wherein the second SPS level flag equal to 0 specifies that affine_type_flag is not present in the coding unit syntax.

Signed and Sealed this
Twenty-sixth Day of March, 2024

Katherine Kelly Vidal
*Director of the United States Patent and Trademark Office*